US007849176B1

(12) United States Patent  (10) Patent No.: US 7,849,176 B1
Jalagam et al.  (45) Date of Patent: Dec. 7, 2010

(54) METHODS AND APPARATUS FOR RENDERING MESSAGES

(75) Inventors: Sesh Jalagam, Santa Clara, CA (US); John D. Panelli, Campbell, CA (US)

(73) Assignee: EMC Corporation, Hopkinton, MA (US)

( * ) Notice: Subject to any disclaimer, the term of this patent is extended or adjusted under 35 U.S.C. 154(b) by 1137 days.

(21) Appl. No.: 11/390,899

(22) Filed: Mar. 28, 2006

(51) Int. Cl.
*G06F 15/173* (2006.01)
*G06F 15/16* (2006.01)
*G06F 15/177* (2006.01)
*G06F 3/00* (2006.01)
*G06F 13/00* (2006.01)
*H04N 7/10* (2006.01)
*H04N 7/025* (2006.01)
*H04N 5/445* (2006.01)

(52) U.S. Cl. .................. 709/223; 709/217; 709/219; 709/220; 709/226; 725/32; 725/39

(58) Field of Classification Search .......... 709/223, 709/217, 219, 220, 226; 706/47; 713/189; 725/32, 39
See application file for complete search history.

(56) References Cited

U.S. PATENT DOCUMENTS 7,403,987 B1 * 7/2008 Marinelli et al. ............ 709/223
2006/0212719 A1 * 9/2006 Miyawaki et al. ........... 713/189

* cited by examiner

*Primary Examiner*—Jefferey F Harold
*Assistant Examiner*—Stephanie Chang
(74) *Attorney, Agent, or Firm*—Chapin IP Law, LLC

(57) ABSTRACT

A message rendering process receives an indication of a selected display context (e.g., one of multiple types of information pages) for viewing information associated with a respective storage area network resource. The message rendering process identifies one or more message data structures stored in a repository. The one or more message data structures are used to potentially display a respective message associated with the selected display context. For example, in response to detecting a presence of message data associated with the message data structure, the message rendering process populates a respective format specified by the message data structure to produce the respective message associated with the selected display context. Consequently, a respective user can view information associated with a respective storage area network resource. The message rendering process automatically initiates display of messages pertinent to the storage area network resource information being viewed by the respective user.

13 Claims, 15 Drawing Sheets

METHODS AND APPARATUS FOR RENDERING MESSAGES

RELATED APPLICATIONS

This application is related to: i) co-pending U.S. patent application entitled "METHODS AND APPARATUS FOR MAPPING RESOURCES," Ser. No. 11/391,106, filed on Mar. 28, 2006, ii) co-pending U.S. patent application entitled "METHODS AND APPARATUS ASSOCIATED WITH ADVISORY GENERATION," Ser. No. 11/391,012, filed on Mar. 28, 2006, and iii) co-pending U.S. patent application entitled "METHODS AND APPARATUS ASSOCIATED WITH ADVISORY GENERATION," Ser. No. 11/390,900, filed on Mar. 28, 2006, the entire teachings of which are incorporated herein by this reference.

BACKGROUND

In general, a so-called storage area network (SAN) is a collection of data storage systems that are networked via a switching fabric to a number of host computer systems operating as servers. The host computers (also known as servers) of a respective storage area network access data stored in respective data storage systems on behalf of client computers that request data. For example, according to conventional techniques, upon receiving a storage access request, a respective host computer in a storage area network accesses a large repository of storage through a switching fabric on behalf of a corresponding requesting client. An access can include a read or write of data to storage.

Typically, many clients can access data through the same host computer or server. Thus, storage area networks enable multiple clients to access one or more shared storage systems through the same host computer. In many applications, storage area networks support hi-speed acquisitions of data so that the host servers are able to promptly retrieve and store data from the data storage system.

A respective infrastructure supporting access to data in a storage area network can be quite complex. For example, as discussed above, consider the number of hardware and software components that must work in harmony in order for a user to successfully access data stored in a storage array of a SAN. To access such data, a user application provides file system calls or requests (e.g., open, read, write and so forth) to a file system resource presented to the user application by an operating system executing on the host computer system. The file system receives the file system calls and operates to map such file system calls to a series of I/O requests. The operating system on the host computer system transmits the I/O requests through a host interface device resource, such as an interface card (e.g., SCSI or FibreChannel adapter) having one or more I/O port resources, across an interface cable or networking medium of one or more switches (e.g., in a storage area network implementation) to a front-end adapter interface card resource operating on a high-capacity data storage array of the SAN. The front-end adapter interface card receives the I/O requests and interprets them to identify appropriate data locations within specific storage device resources contained in the storage array.

After the requested data is accessed from the storage devices, respective I/O responses are typically returned from the accessed storage system to the user application along an information or data flow path (based on operations and processing functionality provided by each of the aforementioned components and resources) in a reverse direction back to the application on the host computer running the client application. In this way, access to data in a conventional storage area network involves reliance on a proper operation and coordination of a multitude of software and hardware resources in a storage area network to retrieve data from storage and serve the data to a client.

If even a single resource such as a switch, operating system, host bus adapter, storage system, etc. in a respective storage area network is incompatible with other hardware and/or software resources present in the storage area network, then the storage area network may no longer operate properly and enable a respective user to retrieve stored data.

One conventional way to ensure that a storage area network will work properly (e.g., so that the storage area network enables users to access corresponding stored data) is to generate a set of interoperability rules indicating valid storage area network configurations and store the interoperability rules in a database. In general, the set of interoperability rules indicates which combination of different types of hardware and software resources are compatible with each other and can be used together in a respective storage area network.

To ensure that a storage area network configuration is valid, an administrator can manually review (e.g., apply) respective interoperability rules with respect to a current or proposed storage area network configuration to ensure that a respective configuration is acceptable prior to actual implementation.

SUMMARY

Conventional applications that support management of a storage area network environment can suffer from a number of deficiencies. For example, as discussed above, management of a storage area network can be a challenge due to the complex network of resources that must be combined so that the storage area network operates properly for a multitude of different types of users. Manual verification of a respective configuration by an administrator can be time-consuming as well as require paying close attention to details. In certain cases, if a respective administrator fails to properly identify that a set of one or more storage area network resources are incompatible, one or more clients in communication with a respective server may not be able to access data in the storage area network. Conventional storage area network configuration verification methods are typically unacceptable for users that need a quick response indicating whether resources in a respective storage area network are compatible.

Techniques discussed herein deviate with respect to conventional applications such as those discussed above as well as other techniques known in the prior art. For example, embodiments herein include a message processing function that renders messages depending on navigation by a respective user. The message processing function (e.g., a message rendering process) automatically generates messages to inform a respective user of incompatible storage area network resources depending on a display context selected by the respective user.

More specifically, one embodiment herein includes first applying a set of compatibility rules to a respective storage area network configuration to produce violation data. The violation data as well as multiple corresponding message data structures are stored in one or more repositories. Upon selection of a viewing page (e.g., a display context) for viewing information associated with a respective storage area network resource, a message rendering process according to an embodiment herein receives an indication of a selected viewing page (i.e., display context) as well as an identifier of the storage area network resource. Based on a currently viewed page (e.g., selected page or display context), the message rendering process initiates a search to identify a set of one or more message data structures that are pertinent for displaying messages associated with the selected page. In one embodiment, each of the message data structures includes an indication of which set of one or more pages the corresponding message data structure pertains. Consequently, the message rendering process can utilize information in or associated with the data structure to identify a set of one or more message data structures that are pertinent for generating messages associated with the user selected display context.

The message rendering process utilizes a respective identifier in or associated with the "pertinent" message data structures to determine whether any associated violation data is present in the repository for purposes of creating messages for viewing by the user. The respective identifier in the data structure indicates a specific type of message data that will be used to generate messages by the corresponding data structure. If there is violation data (e.g., message data) in the repository for a particular data structure and the data structure pertains to a currently viewed page on a user's display screen, the message rendering process retrieves the appropriate violation data from the repository and populates a respective format specified by the data structure to produce one or more messages for display on the user's display screen along with a display of content selected by a user. Accordingly, a respective user viewing a display screen can view information associated with a selected storage area network resource as well as automatically receive pertinent messages indicating, for example, that certain storage area network resources in a currently implemented or proposed storage area network configuration are incompatible. Also, a respective user can intentionally select a corresponding display context for purposes of viewing rule violation messages associated with one or more respective storage area network resources.

In view of the specific embodiment discussed above, more general embodiments herein are directed to a message rendering process that receives an indication of a selected display context (e.g., one of multiple types of information pages) for viewing information associated with a respective storage area network resource. The message rendering process identifies one or more pertinent message data structures stored in a repository. The one or more message data structures are used to potentially display one or more respective messages associated with the selected display context. For example, in response to detecting a presence of message data associated with the message data structure, the message rendering process populates a respective format specified by the message data structure to produce the respective message (or messages) associated with the selected display context.

Consequently, a respective user can initiate viewing of information associated with a respective storage area network resource. The message rendering process automatically initiates display of one or more messages pertinent to the storage area network resource information being viewed by the respective user.

In certain cases, a set including one or more data structures may pertain to a selected page currently view by a respective user. However, in response to detecting a lack of a presence of message data (e.g., rule violation data generated by a storage area network advisory process) associated with the set of pertinent message data structures, the message rendering process does not initiate display of any pertinent messages for viewing on a respective display screen along with a the selected page of information. In other words, when there are no violations or message data associated with content currently viewed by a user, a respective display screen provides a visual rendering of the content associated with the selected display context (e.g., a particular storage area network resource) without producing any respective resource compatibility violation messages.

In one embodiment, as previously discussed, the message rendering process can review specific information stored in or associated with each of multiple data structures to identify which, if any, of the multiple data structures include a respective identifier value identifying the selected display context selected by a user. In other words, respective identifier values (e.g., information in or associated with the data structures) indicate whether a respective message data structure stored in the repository includes a message format for potentially displaying messages associated with the selected display context. As discussed above, a storage area network advisory process may or may not have generated rule violation data associated with the selected display context. Accordingly, the message rendering process herein conditionally initiates display of messages along with the current display context selected by a user depending on whether the rule violation data (e.g., message data) has been generated by a corresponding storage area network advisory process that applies a respective set of compatibility rules to test a storage area network configuration.

In a further embodiment, each of the data structures includes a message data identifier value (e.g., an identifier value) that indicates which portion of an overall set of rule violation data (if any happens to exist) to use when populating a respective format associated with the data structure. Accordingly, in one embodiment, the message rendering process uses the message data identifier value associated with a respective data structure to search a respective repository of message data and identify the message data associated with the message data structure. In one embodiment, the message data structure includes one or more formats for displaying violation messages associated with a particular one of multiple compatibility rules. As previously discussed, if no rule violation data happens to exist for an applied compatibly rule, there will be no respective message data stored in the repository for populating a message template or format (associated with a respective data structure) and no message will be displayed to the user.

For cases in which the message rendering process detects a presence of message data (e.g., rule violation data) associated with a respective message format pertinent to a display context selected by a user, the message rendering process can generate a respective message based on text strings retrieved from both the message data structure and corresponding message data. For example, the message rendering process can generate a first portion of the respective message based on text string information (e.g., generic information) associated with the respective format specified by the message data structure. Additionally, the message rendering process can generate a second portion of the message based on text string information (e.g., failure specific information such as message violation data) retrieved from the message data associated with the message data structure.

A benefit of utilizing the message rendering process and related data structures according to certain embodiments herein is to reduce processing and storage overhead required to generate messages associated with a complex storage area network. For example, as discussed above, a storage area network environment can include a complex configuration of many types of resources. In one embodiment, a storage area network advisory process generates a set of raw rule violation data associated with each of multiple compatibly rules applied to a current storage area network configuration. Corresponding message data structures in the repository include one or more respective templates for creating rule violation messages based on the rule violation data. Hence, in this example embodiment, the storage area network advisory process needs only to generate the data for populating the corresponding message formats specified by the data structures rather than generate and initiate display of individual messages for each violation to a respective user.

Techniques herein are well suited for use in applications such as management and display of resource incompatibility messages associated with a respective storage area network environments and other types of applications that generate and initiate display of messages depending on a display context. However, it should be noted that configurations herein are not limited to such use and thus configurations herein and deviations thereof are well suited for use in other environments that generate messages as well.

In addition to the embodiments discussed above, other embodiments herein include a computerized device (e.g., a host computer, workstation, etc.) configured to support the techniques disclosed herein to facilitate rendering of messages associated with a respective storage area network environment. In such embodiments, the computerized device such as a message rendering system includes a memory system, a processor (e.g., a processing device), a respective display to display messages, and an interconnect connecting the processor and the memory system. The interconnect can also support communications with the respective display (e.g., display screen or display medium). The memory system is encoded with a management application that, when executed on the processor, generates a process for rendering messages according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to render messages according to embodiments herein. For example, the computer program logic, when executed on at least one processor associated with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product that includes a computer readable medium having instructions stored thereon for rendering resource incompatibility messages according to an embodiment herein. The instructions, when carried out by a processor of a respective computer device, cause the processor to perform the steps of: i) receiving an indication of a selected display context for viewing information associated with a respective storage area network resource; ii) identifying a message data structure for potentially displaying a respective message associated with the selected display context; and iii) in response to detecting a presence of message data associated with the message data structure, populating a respective format specified by the message data structure to produce the respective message associated with the selected display context.

In another embodiment, a set of instructions supports operations of: i) receiving an indication of a currently displayed page for viewing information associated with a respective storage area network resource, the currently displayed page being one of multiple selectable pages selected by a respective user; ii) identifying which of multiple data structures are pertinent for displaying message information associated with the currently displayed page; iii) for a set of at least one pertinent data structure associated with the currently displayed page, detecting whether violation data exists for populating a corresponding at least one format associated with the at least one pertinent data structure; and iv) if the violation data exists for the at least one pertinent data structure, initiating display of at least one message along with the currently displayed page by populating the respective at least one format specified by the set of at least one pertinent data structure with the violation data. Other embodiments of the present application include software programs to perform any of the method embodiment steps and operations summarized above and disclosed in detail below.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate in connection with the Control Center (ECC) software. Control Center software is manufactured by EMC Corporation of Hopkinton, Mass., USA.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

FIG. 13 is a sample screenshot of a display screen including resource incompatibility messages according to an embodiment herein.

FIG. 14 is a sample screenshot of a display screen including resource incompatibility messages according to an embodiment herein.

DETAILED DESCRIPTION

According to one embodiment, a message rendering process receives an indication of a selected display context (e.g., one of multiple types of information pages) for viewing information associated with a respective storage area network resource. The message rendering process identifies one or more message data structures stored in a repository. The one or more message data structures are used to potentially display a respective message associated with the selected display context. In response to detecting a presence of message data associated with the message data structure, the message rendering process populates a respective format specified by the message data structure to produce the respective message associated with the selected display context. Consequently, a respective user can view information associated with a respective storage area network resource while a message rendering process automatically initiates display of messages pertinent to the storage area network resource information being viewed by the respective user.

Figure 1:
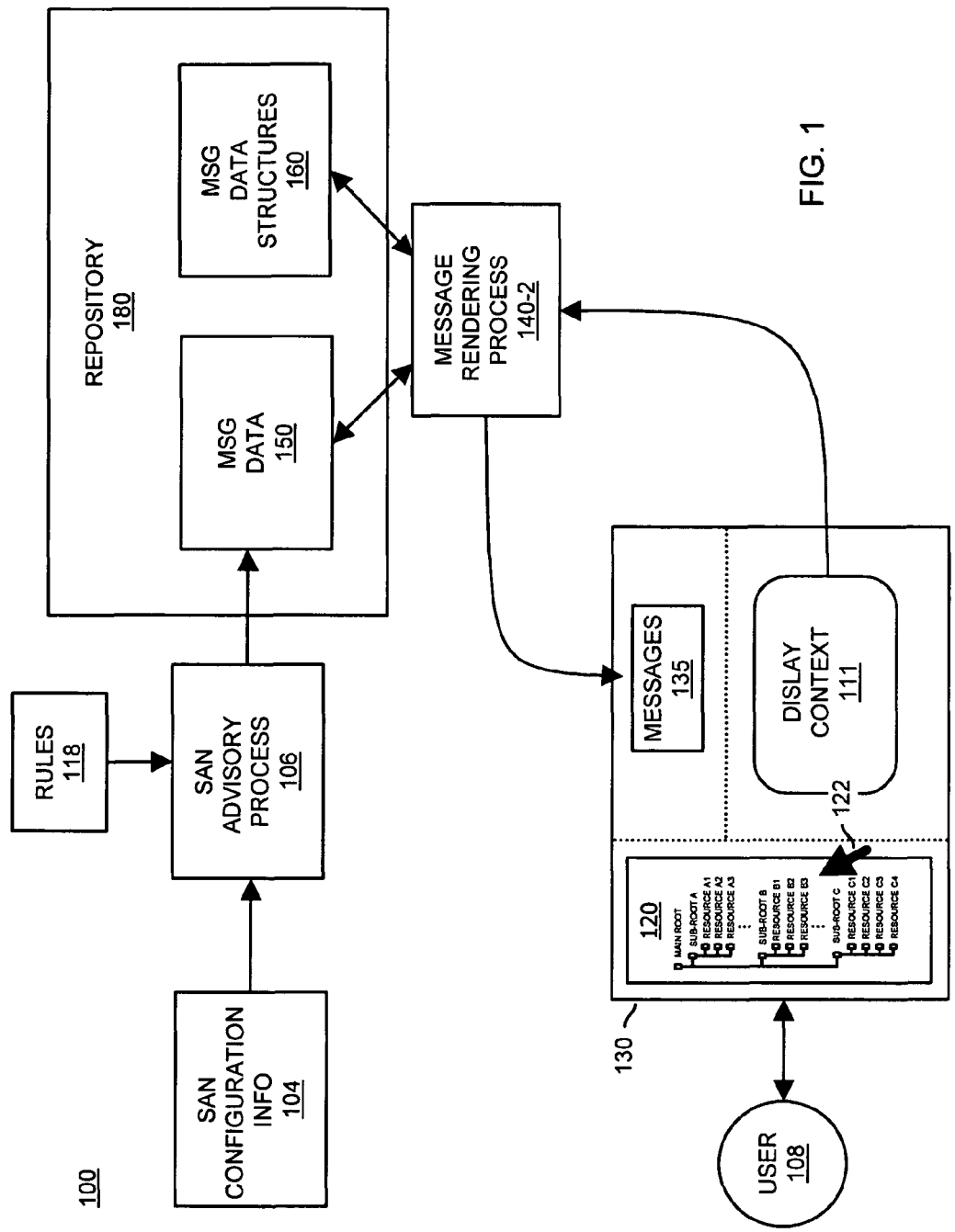
FIG. 1 is a diagram illustrating an environment for generating messages according to an embodiment herein.

FIG. 1 is a block diagram of a storage area network environment 100 according to an embodiment herein. As shown, storage area network environment 100 includes SAN configuration information 104, SAN advisory process 106, rules 118, repository 180, message rendering process 140-2, display screen 130, and user 108. Repository 180 stores message data 150 and message data structures 160. Display screen 130 displays hierarchical tree 120, messages 135, and display context 111.

In a general embodiment, SAN configuration information 104 represents a proposed or currently implemented configuration of storage area network resources. SAN advisory process 106 applies rules 118 for purposes of identifying storage area network resources that are incompatible with each other and generates corresponding message data 150. Message data structures 160 define respective formats and rules for creating compatibility violation messages using message data 150. For example, in one embodiment, message rendering process 140-2 receives an indication of a current display context 111 selected by respective user 108 as well as a respective storage area network resource selected from hierarchical tree 120. Based on the user selected display context 111 and/or the selected storage area network resource, message rendering process 140-2 identifies pertinent message data structures 160 in repository 180 for purposes of creating messages 135. In one embodiment, the message rendering process 140-2 utilizes the message data 150 to populate respective formats specified by the message data structures 160.

Accordingly, embodiments herein include applying a set of rules 118 (e.g., compatibility rules) to a respective storage area network configuration 104 to produce raw message data 150 (e.g., violation data). The message data 150 as well as multiple corresponding message data structures 160 are stored in a repository 180 (or multiple different repositories). Upon selection of a specific viewing page (e.g., a display context 111) for viewing information associated with a respective storage area network resource from hierarchical tree 120, message rendering process 140-2 receives an indication of a selected viewing page as well as an identifier of the selected storage area network resource. In one embodiment, a respective user can select an option for receiving advisory reports (including the generated messages) as e-mail. In such an instance, the message rendering process 140-2 generates an advisory and forwards the messages in the advisory report to a respective e-mail address for viewing by a user. Alternatively, the user can view a report. Based on a context of which portion of the report the user happens to be viewing, appropriate display messages are displayed for a respective user.

Based on a currently viewed display context 111 (e.g., selected information page such as an e-mail account), the message rendering process 140-2 searches the repository 180 to identify a set of one or more message data structures 160 that are pertinent for displaying messages associated with the selected display context 111. In one embodiment, each of the message data structures 160 includes an indication of which set of one or more pages the corresponding message data structure pertains. Consequently, the message rendering process 140-2 utilizes information in or associated with the message data structures 160 to identify a set of one or more message data structures that are pertinent for generating messages 135 associated with the user selected display context 111 and selected storage area network resource.

The message rendering process 140-2 can utilize a respective identifier in the identified "pertinent" message data structures to determine whether any associated message data 150 is present in the repository 180 for purposes of creating messages for viewing by the user 108 on display screen 130. The respective identifier in a corresponding data structure indicates a specific type of message data 150 that can be used to generate messages by the corresponding data structure. If there is message data 150 (e.g., compatibility violation data) in the repository 180 for a particular data structure and the data structure pertains to a currently viewed display context 111 on a user's display screen 130, the message rendering process 140-2 retrieves the appropriate message data 150 (e.g., violation data) from the repository 180 and populates a respective format specified by the data structure to produce one or more messages 135 for display on the user's display screen 130. Accordingly, a respective user 108 viewing a display screen 130 can view information associated with a selected storage area network resource as well as automatically receive a display of pertinent messages 135 indicating, for example, that certain storage area network resources in a currently implemented or proposed storage area network configuration are incompatible.

Figure 2:
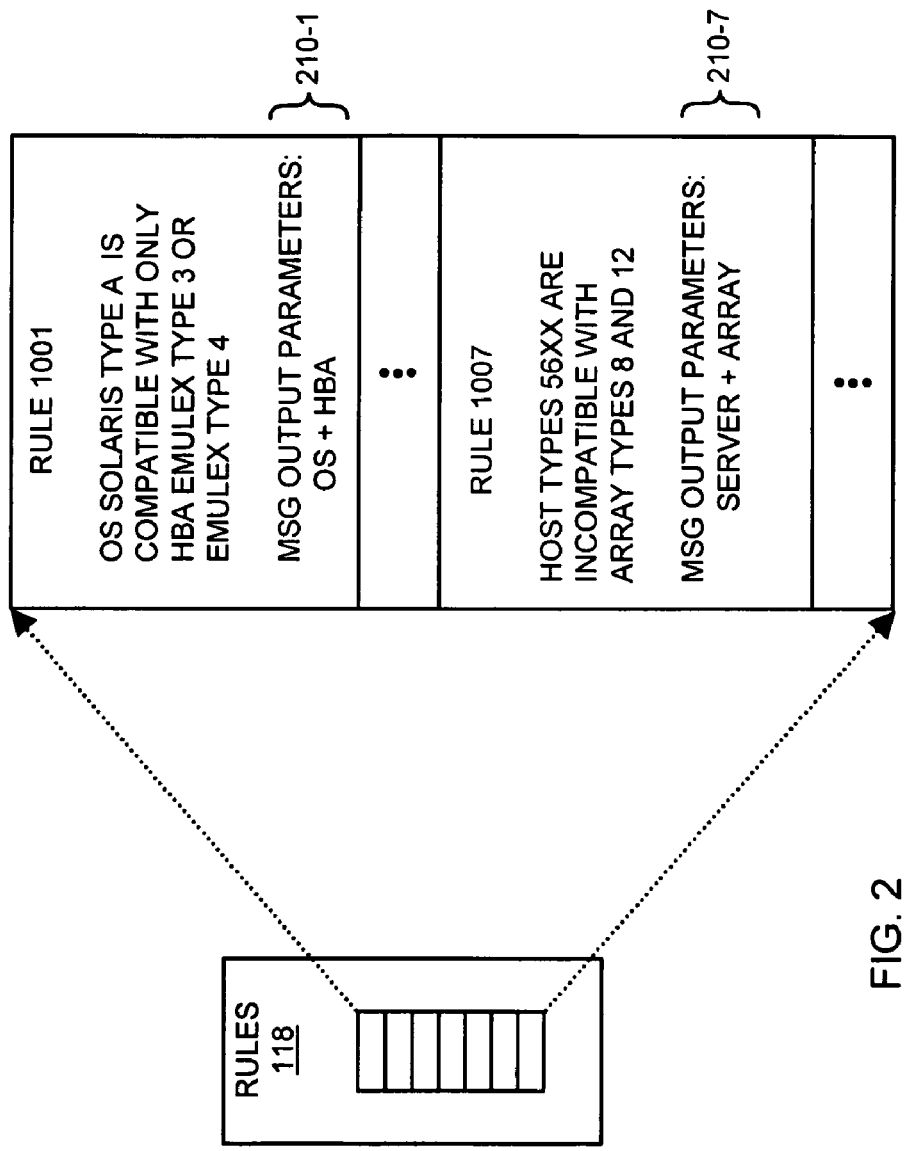
FIG. 2 is a diagram illustrating example compatibility rules according to an embodiment herein.

FIG. 2 is a diagram illustrating example compatibility rules according to an embodiment herein. As shown, rules 118 include rule 1001, . . . , rule 1007, . . . . For this example, rule 1001 indicates that a Solaris™ type A (e.g., a specific version, make, and/or configuration) operating system running a host computer or server is compatible only with Emulex™ type 3 or type 4 host bus adapters. Rule 1001 can be applied by SAN advisory process 106 to determine incompatibility with respect to host computers (e.g., servers) and corresponding host bus adapters of a proposed or implemented storage area network environment as identified by SAN configuration information 104 in FIG. 1.

For this example, rule 1007 of FIG. 2 indicates that any combination of a host or server categorized as a 56XX type series (e.g., 5601, 5602, 5610, etc.) is incompatible with storage arrays of type 8 and 12. Rule 1007 can be applied by SAN advisory process 106 to determine incompatibility with respect to host computers (e.g., servers) and corresponding storage arrays of a proposed or implemented storage area network environment as identified by SAN configuration information 104 in FIG. 1. As previously discussed above, violation of any or all of rules 118 can render a respective storage area network inoperable. Thus, it is beneficial to notify a respective user (e.g., storage area network manager) of any detected incompatibility errors, especially in a relevant context as viewed by a respective user 108.

Each of respective rules 118 includes message data output parameters 210 that are used to create message data 150 in the event of detecting a failure. For example, assume that the SAN configuration information 104 includes a server (named SERVER 1) of type 5601 connected to a specific type of storage array such as an array type 8. Further assume that SERVER 1 (e.g., a host computer) implements a Solaris™ type A operating system and both an Emulex™ type 1 and Emulex™ type 2 host bus adapters. The message data output parameters 210 in each rule provide an indication to the SAN advisory process 106 of what information such as raw message data or text information strings (associated with a respective compatibility check) to store in a respective record of message data 150 when a violation error is detected.

Figure 3:
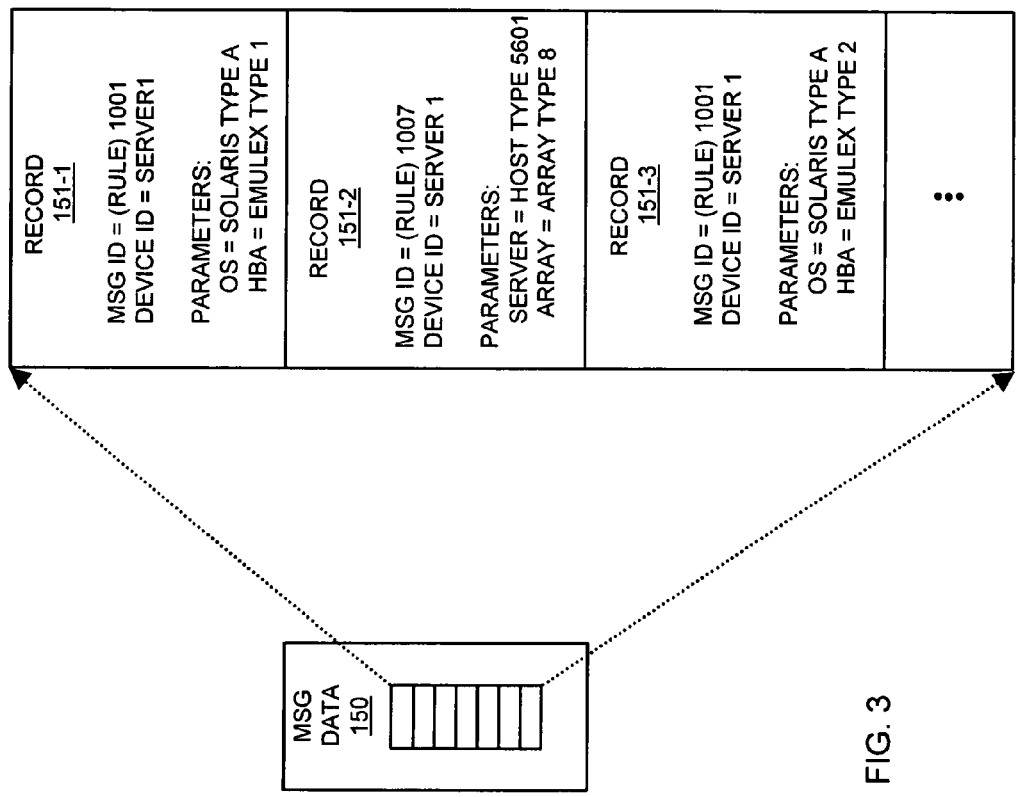
FIG. 3 is a diagram illustrating sample records including message data according to an embodiment herein.

For example, when the SAN advisory process 106 applies rules 118 (e.g., rule 1001 and rule 1007), the SAN advisory process 106 generates the message data 150 (e.g., violation data) as shown in FIG. 3. FIG. 3 is a diagram illustrating sample record 151-1, record 151-2, and record 151-3, . . . (collectively, records 151) associated with message data 150 according to an embodiment herein. SAN advisory process 106 generates and stores message data 150 associated with detected rule violations. Note that each record in message data 150 corresponds to a respective violation and includes message parameter information as identified by the rule that failed.

As an example, SAN advisory process 106 applies rule 1001 to identify that SAN configuration information 104 violates a requirement that a Solaris™ type A operating system can only be used with a Emulex type 3 or type 4 host bus adapter. The SAN advisory process 106 identifies two rule violations because, per rule 1001, SERVER 1 of the present example implements a Solaris™ type A operating system with both an Emulex™ type 1 and Emulex™ type 2 host bus adapters. Neither of the Emulex™ type 1 or type 2 host bus adapters are compatible with the Solaris™ type A operating system. SAN advisory process 106 utilizes the message output parameters 210-1 of failing rule 1001 to create record 150-1. For example, SAN advisory process 106 identifies that message output parameters 210-1 associated with rule 1001 includes the operating system and host bus adapter (from the SAN configuration information 104) that are incompatible and thus violate the respective rule. Accordingly, in this example, SAN advisory process 106 produces record 151-1 to include message parameters indicating the Solaris™ type A and the Emulex™ type 1 host bus adapter. The SAN advisory process 106 also creates record 151-1 to include an identifier of the rule (e.g., rule 1001) that fails as well as a device identifier (e.g., SERVER 1) to which the record 151-1 pertains.

For the second rule 1001 violation, the SAN advisory process 106 identifies that message output parameters 210-1 associated with rule 1001 includes the operating system and host bus adapter. Accordingly, for this second rule violation, the SAN advisory process 106 produces record 151-3 to include message parameters identifying the Solaris™ type A and the Emulex™ type 2 host bus adapter as an incompatible combination of storage area network resources. The SAN advisory process 106 also creates record 151-3 to include an identifier of the rule (e.g., rule 1001) that fails as well as a device identifier (e.g., SERVER 1) to which the record 151-3 pertains.

As discussed above, the SAN advisory process 106 applies rule 1007 to identify another rule violation associated with the SAN configuration information 104. For example, based on application of rule 1007, the SAN advisory process 106 indicates that the host type 5601 (for SERVER 1) in the present example is incompatible with the array type 8. When generating record 151-2, the SAN advisory process 106 utilizes the message data output parameters 210-7 to create record 151-2. In other words, the SAN advisory process 106 stores server information (e.g., host type 5601) and array information (e.g., array type 8) associated with the rule violation in record 151-2.

Figure 4:
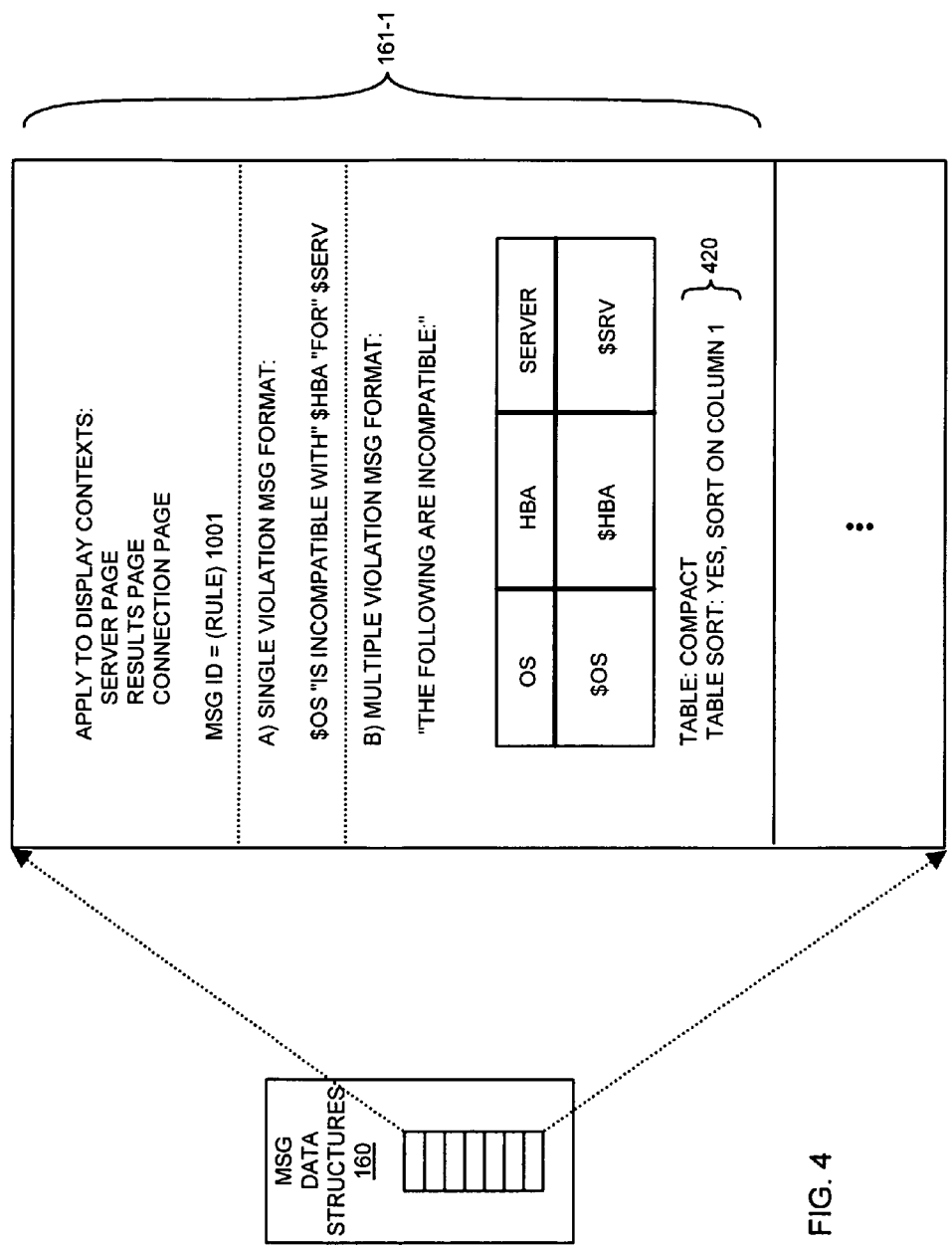
FIG. 4 is a diagram of message data structures for generating messages according to an embodiment herein.

FIG. 4 is a diagram of message data structures 160 for generating messages 135 according to an embodiment herein. In general, the message data structures 160 include respective formats that are populated with message data 150 to produce messages 135. As previously discussed, the message rendering process 140-2 displays messages 135 in response to a current display context 111 selected by user 108. Accordingly, a user 108 can view relevant messages 135 (e.g., rule violation messages) on display screen 130 when there is a logical connection between the messages 135 (e.g., rule violations) and other content (e.g., storage area network configuration information) currently displayed on the display screen 130.

In general, according to one embodiment, each data structure 161 maintains reference information (e.g., display context 111 identifiers such as "server page," results page," and connection page" as in message data structure 161-1) indicating a respective set of at least one selectable display context 111 to which the corresponding message data structure pertains. In other words, data structure 161-1 pertains to a respective display context 111 showing a server page, results page, and connection page. The pages to which a respective message data structure pertains can vary as previously discussed.

Each data structure 161 maintains formatting information (e.g., format A and format B) specifying a corresponding format for displaying message information associated with the display context 111. Additionally, each data structure 161 can maintain an identifier value (e.g., rule 1001) indicating corresponding message data 150 (e.g., violation data) stored in a record location of repository 180. Corresponding records such record 151-1 and 151-3 (FIG. 3) can be stored independently of the corresponding message data structure 161-1 as shown. In other words, the message data 150 is stored in one data structure while the message data structure is stored as a separate data structure. The value of the message ID serves as a link between the separately stored content.

In one embodiment, each of rules 118 includes a corresponding message data structure 160 for purposes of creating rule violation messages. As shown, data structure 161-1 indicates which display context 111 that messages 135 will be displayed as well as defines how to create messages 135 in the event of a respective rule violation.

For example, data structure 161-1 indicates (via reference information such as server page, results page, and connection page) that rule violation messages for message ID (rule)

1001 will be displayed on display screen 130 when a respective user 108 selects a display context 111 such as a server page, a results page, or a connection page. In the event that display context 111 currently selected by user 108 on display screen 130 is not one of these types of pages, the message rendering process 140-2 does not generate any messages associated with rule 1001. Accordingly, embodiments herein include reviewing data information (e.g., entries beneath "apply to display contexts" in data structure 161-1) stored in each of multiple message data structures 160 to identify which, if any, of the multiple message data structures 160 include a respective identifier value identifying a currently selected display context, and indicating that a respective data structure includes a message format for conditionally displaying messages associated with the selected display context 111.

If a respective user 108 happens to view a display context 111 including one of the identified types of pages to which the data structure 161-1 pertains, then the message rendering process 140-2 utilizes records in message data 150 (if any exists as a result of a previous application of the rules 118) as identified by message ID 1001 for creating messages 135. In other words, if the respective user 108 views a server page on display screen 130 and there exists one or more records 151 of raw data for purposes of creating messages 135 associated with the data structure 161-1, the message rendering process 140-2 retrieves the relevant records and populates respective formats specified by the data structure 161-1 to create messages 135.

In the embodiment shown in FIG. 4, the message rendering process 140-2 can choose from multiple types of formats depending on the number of rule violations that occur for a particular rule. For example, if the SAN advisory process 106 produces only a single rule violation for a given rule, then the message rendering process 140-2 uses format A to generate a respective message 135 on display screen 130. If the SAN advisory process 106 produces several rule violations for a given rule, then the message rendering process 140-2 uses format B (e.g., a table format) to generate a respective message 135 on display screen 130.

Note that format B of data structure 161-1 can include supplemental display property information 420 indicating how message rendering process 140-2 will format a respective message for viewing on display screen 130. For example, the supplemental display property information 420 of data structure 161-1 indicates that the respective table format associated with type B will be displayed in a compact form as opposed to a full form. Also, the supplemental display property information 420 indicates display parameters such as how to sort columns of the table in format B for viewing by user 108.

As previously discussed, when creating a respective message on display screen 130 for viewing by user 108, the message rendering process 140-2 plugs in the information stored in records of message data 150 to create the messages 135. As an example, suppose the user 108 selects a server page as a respective display context 111. Because data structure 161-1 is pertinent for displaying messages associated with the server page, the message rendering process 140-2 uses message ID 1001 of the data structure 161-1 to identify if any records exist for populating formats associated with data structure 161-1. In this example, the message rendering process 140-2 searches message data 150 and identifies that two records (namely record 151-1 and 151-3) include data for creating messages 135. To create the messages 135, the message rendering process 140-2 uses the strings of text (e.g., "Solaris type A and "Emulex type 1") identifying the failed or incompatible storage area network resources to create messages 135. More specifically, the message rendering process 140-2 uses these text strings to plug into $OS and $HBA of the respective data structure 161-1 to create messages 135 as will be further discussed with respect to FIG. 5.

Figure 5:
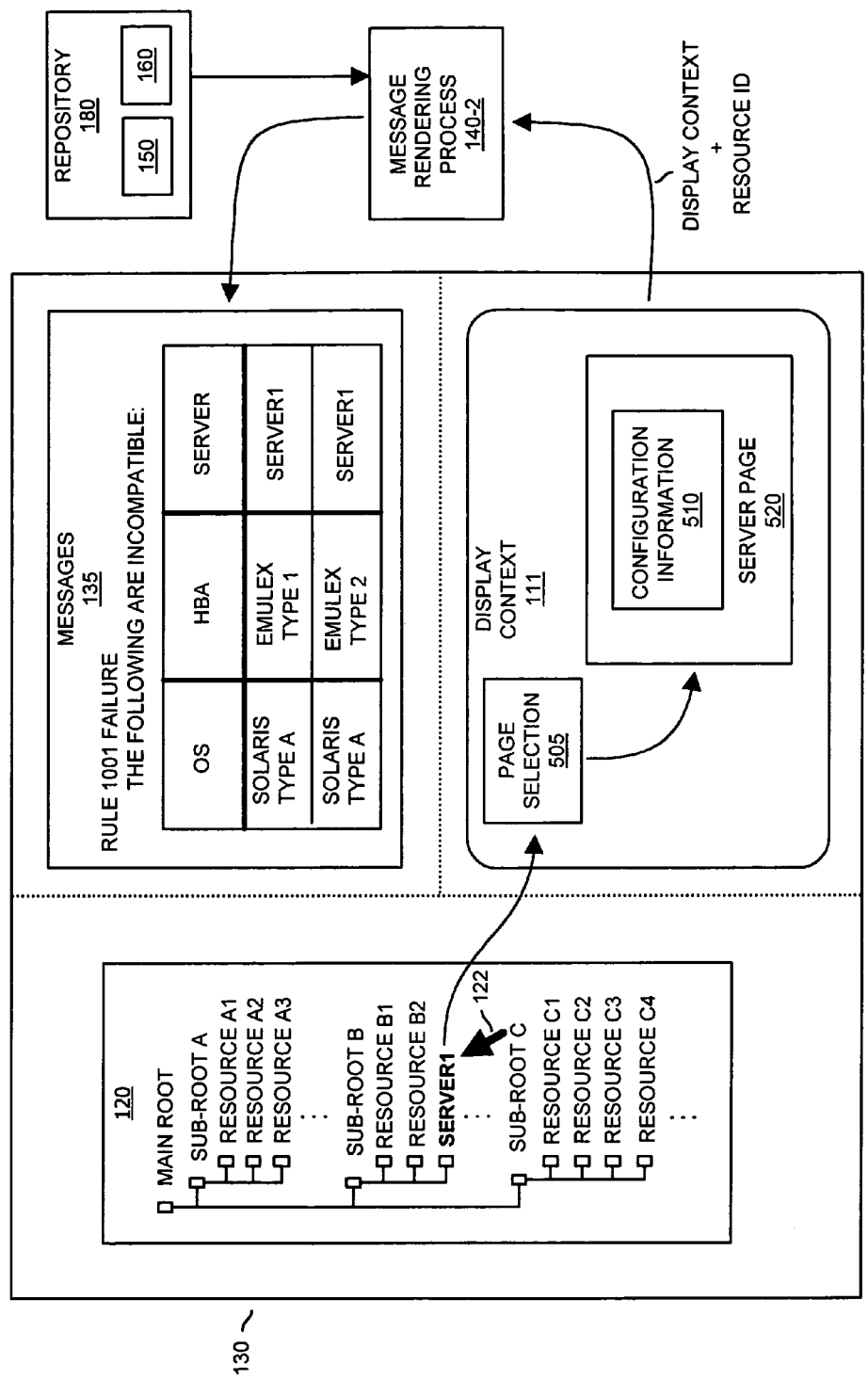
FIG. 5 is a diagram of a display screen illustrating automatic generation of messages depending on a respective display context according to an embodiment herein.

FIG. 5 is a diagram of a display screen 130 illustrating automatic generation of messages 135 depending on a selected display context 111 according to an embodiment herein. As shown, user 108 initially selects an item (e.g., SERVER 1) from hierarchical tree 120. Hierarchical tree 120 displays resources and sub-resources associated with a respective storage area network environment as nodes and sub-nodes with respect to a common root.

In the present example, the user utilizes pointer 122 (e.g., based on movement of a selection tool such as a handheld computer mouse) to select a storage area network resource such as SERVER 1. The user 108 further initiates a page selection 505 to view specific information associated with SERVER 1. In response to a page selection 505 (e.g., display context 111 selection), a respective display manager initiates display of configuration information 510 associated with SERVER 1 on server page 520.

In response to selection of a current display context 111, message rendering process 140-2 receives an indication of a selected display context (e.g., one of multiple types of information pages) and/or resource ID of SERVER 1 for viewing information associated with the selected storage area network resource (i.e., SERVER 1). In response to receiving such input, the message rendering process 140-2 identifies one or more message data structures 160 stored in repository 180 that pertain to the currently selected display context 111. As previously discussed, the set of one or more identified message data structures that pertain to the display context 111 are potentially used to display one or more respective messages associated with the selected display context.

Note that the message rendering process 140-2 can utilize the storage area network resource identifier (e.g., SERVER 1) to identify or filter which portion of violation data records pertains to the selected storage area network resource. Thus, if multiple rule violations happen to occur for both SERVER 1 and SERVER 2 of the storage area network environment 100, the message rendering process 140-2 can use the storage area network resource identifier (e.g., SERVER 1) to identify and display only messages that pertain to SERVER 1 and not SERVER 2.

In response to detecting that data structure 161-1 of message data structures 160 is pertinent for displaying messages associated with server page 520, the message rendering process 140-2 utilizes the message ID of the data structure 161-1 to identify whether any rule violations occurred with respect to rule 1001. In other words, message rendering process 140-2 checks message data 150 of FIG. 3 to identify any records associated with message ID 1001. In the present example, both records 151-1 and 151-3 include rule violation information associated with rule 1001. Additionally, both rules have a device ID that matches the storage area network resource (i.e., SERVER 1) selected from the hierarchical tree 120. Consequently, the message rendering process 140-2 utilizes the parameter information in records 151-1 and 151-3 to populate a respective format (e.g., format B) in data structure 161-1 to create messages 135 on display screen 130 as shown in FIG. 5. Note that the message rendering process 140-2 utilizes format B of data structure 161-1 because there are multiple rule violations for rule 1001.

Thus, according to embodiments herein, a respective user 108 can initiate viewing of information (e.g., server page 520 and configuration information 510) associated with a respective storage area network resource (e.g., SERVER 1). The message rendering process 140-2 automatically initiates display of one or more messages 135 pertinent to the storage area network resource information being viewed by the respective user 108 so that the user can modify the storage area network environment and address any incompatibility issues as identified by messages 135 on display screen 130.

In certain cases, a set of one or more data structures 160 may pertain to a selected display context 111 (e.g., page) currently viewed by a respective user 108 on display screen. However, in response to detecting a lack of a presence of relevant message data 150 for populating a set of one or more pertinent message data structures, the message rendering process 140-2 does not initiate display of any pertinent messages for viewing on a respective display screen 130 along with the selected page of information. In other words, when there are no violations or message data 150 (e.g., records) associated with content (e.g., display context 111 or selected storage area network resource) currently selected by a user 108, a respective display screen provides only a visual rendering of the content associated with the selected display context (e.g., a particular storage area network resource) without producing any respective resource compatibility violation messages.

A benefit of utilizing the message rendering process 140-2 and related data structures 160 according to certain embodiments herein is to reduce processing and storage overhead required to generate messages associated with a complex storage area network. For example, as discussed above, a storage area network environment 100 can include a complex configuration of many resources. In one embodiment, a storage area network advisory process 106 generates a set of rule violation data associated with each of multiple compatibly rules 118 applied to a current storage area network configuration information 104. Corresponding message data structures 160 include one or more respective templates or formats for creating rule violation messages based on the rule violation data (e.g., message data 150). Hence, in this example embodiment, the storage area network advisory process 106 needs only to generate the message data 150 for populating the corresponding message formats specified by the data structures rather than generate and/or initiate display of individual messages for each violation to a respective user 108.

Figure 6:
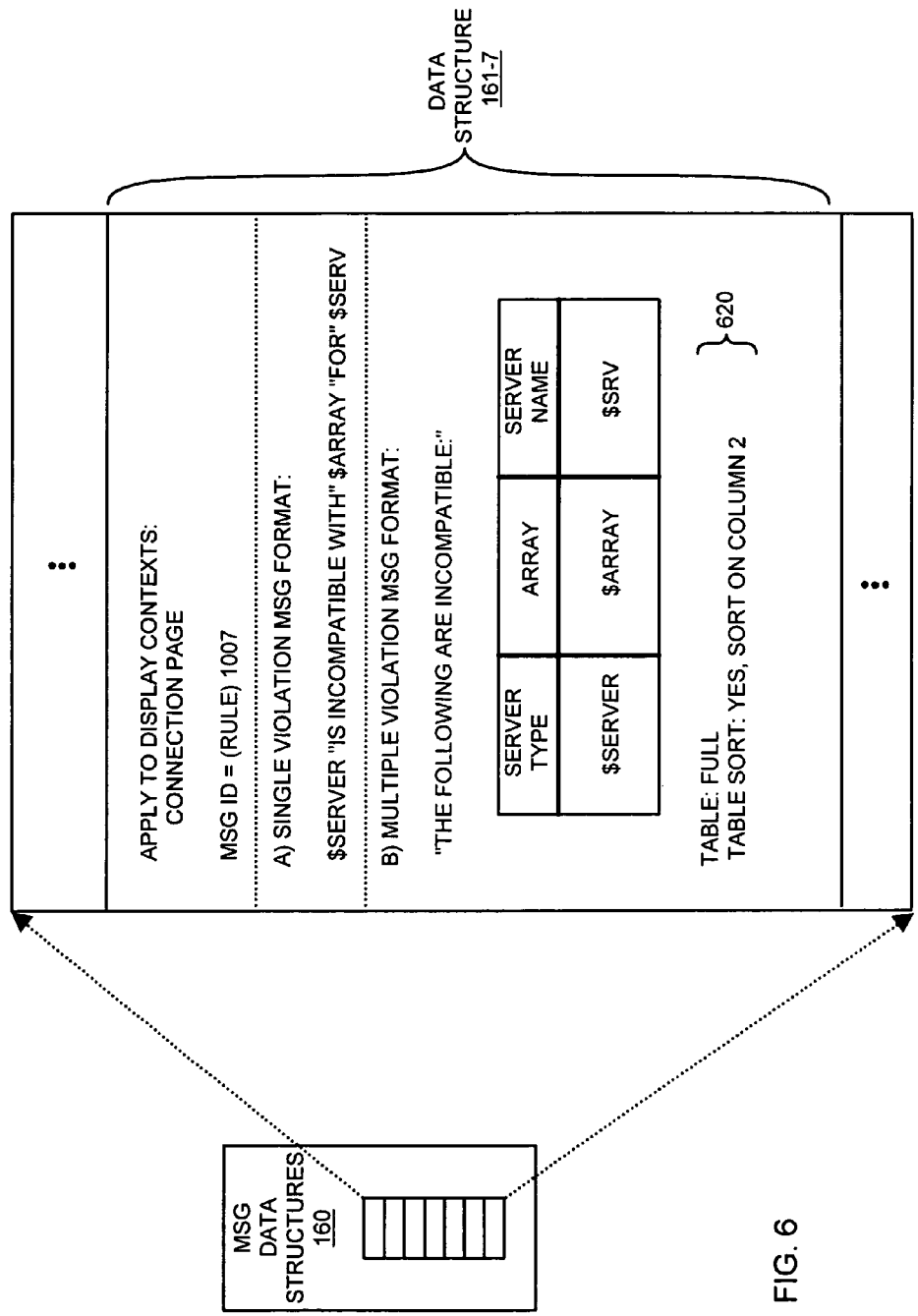
FIG. 6 is a diagram of message data structures for generating messages according to an embodiment herein.

FIG. 6 is a diagram of a sample message data structure 161-7 for generating messages associated with rule 1007 according to an embodiment herein. As shown, data structure 161-7 is applicable for generating messages when a respective user 108 selects a connection page for viewing in display context 111 of display screen 130. Data structure 161-7 indicates that a respective message ID=1007. Thus, data structure 161-7 utilizes raw data from record 151-2 (FIG. 3) to generate a message for user 108 when the connection page is selected for viewing in display context 111.

In the present example, data structure 161-7 includes two different formats for creating violations messages. Respective format A is used to generate a violation message when only a single violation occurs for rule 1007. Respective format B is used to generate a violation message when multiple violations occur for rule 1007. Supplemental display property information 620 indicates how to display information for the multiple message violation format (e.g., format B).

Figure 7:
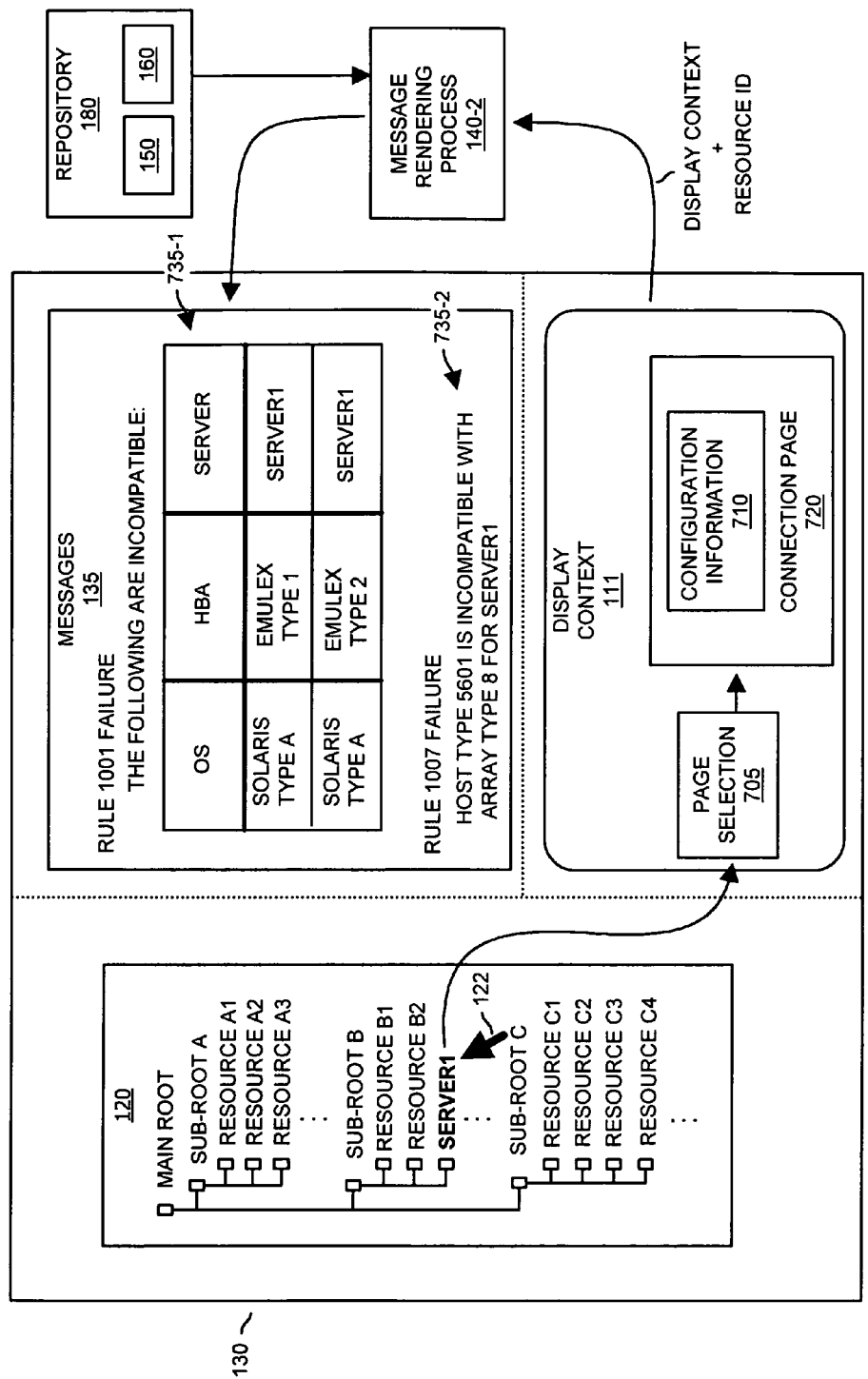
FIG. 7 is a diagram of a display screen illustrating automatic generation of messages depending on a respective display context according to an embodiment herein.

FIG. 7 is a diagram of a display screen 130 illustrating automatic generation of messages 135 depending on selection of a respective display context 111 according to an embodiment herein. As shown, the user selects a storage area network resource named SERVER 1 from hierarchical tree 120. The user then initiates page selection 705 (e.g., selection of one of multiple pages) to display connection page 720 to view respective configuration information 710. Similar to techniques discussed above, the message rendering process 140-2 identifies in this case that the both data structures 161-1 and 161-2 are pertinent for displaying messages associated with connection page 720.

For example, based on the message data 150 (FIG. 3), the message rendering process 140-2 utilizes corresponding message ID 1001 (associated with data structure 161-1) to identify records 151-1 and 151-3 for generating message 735-1 on display screen 130. Additionally, the message rendering process 140-2 utilizes corresponding message ID 1007 (associated with data structure 161-7) to identify record 151-2 for generating message 735-2 on display screen 130. Note that message 735-2 is not in tabular form because there was only one rule violation associated with rule 1007. In other words, the message rendering process 140-2 utilizes respective format A of data structure 161-7 to generate message 735-2.

Accordingly, embodiments herein include a message rendering process 140-2 that processes message data 150 to determine a number of violations associated with a selected storage area network resource in display context 111. The message rendering process 140-2 selects a particular format of a data structure 161 to accommodate the existing number of rule violations that occur for a given rule.

Note that generation of message 735-2 includes utilizing a portion of information (e.g., text strings) from data structure 161-7 as well a respective portion of information (e.g., text strings) from record 151-2 of message data 150. For example, the message rendering process 140-2 identifies that the words "is incompatible with" and "for" will be used to construct message 735-2. The information associated with $server and $array are filled in based on information retrieved from record 151-2. For example, the message rendering process 140-2 fills in $server with the text string "host type 5601" and $array with the text string "array type 8" to create the message 735-2, which reads: "Host Type 5601 is incompatible with array type 8 for SERVER 1."

Although the above embodiments discuss examples in which the display context 111 represents one of multiple display pages for viewing configuration information, the display context 111 can be based on other information as well. For example, a display context 111 associated with display screen 130 and sent to message rendering process 140-2 can include historical information identifying a navigation path of multiple successive pages selected by a user 108 viewing a display screen 130. In such an embodiment, the message rendering process 140-2 populates a respective format in a pertinent data structure depending on the navigation path of the user 108.

Additionally, the display context 111 can include information such as a privilege level or skill level associated with a user viewing display screen 130. In this latter example, the message rendering process 140-2 can provide different types formatting of messages on display screen based on the user type. The message rendering process 140-2 can generate more detailed messages 135 for junior users and more compact messages for more experienced users. Supplemental display property information in a respective message data structure can be used to indicate how to display the messages 135 in a different manner depending on a respective type of user viewing the information on display screen 130.

Figure 8:
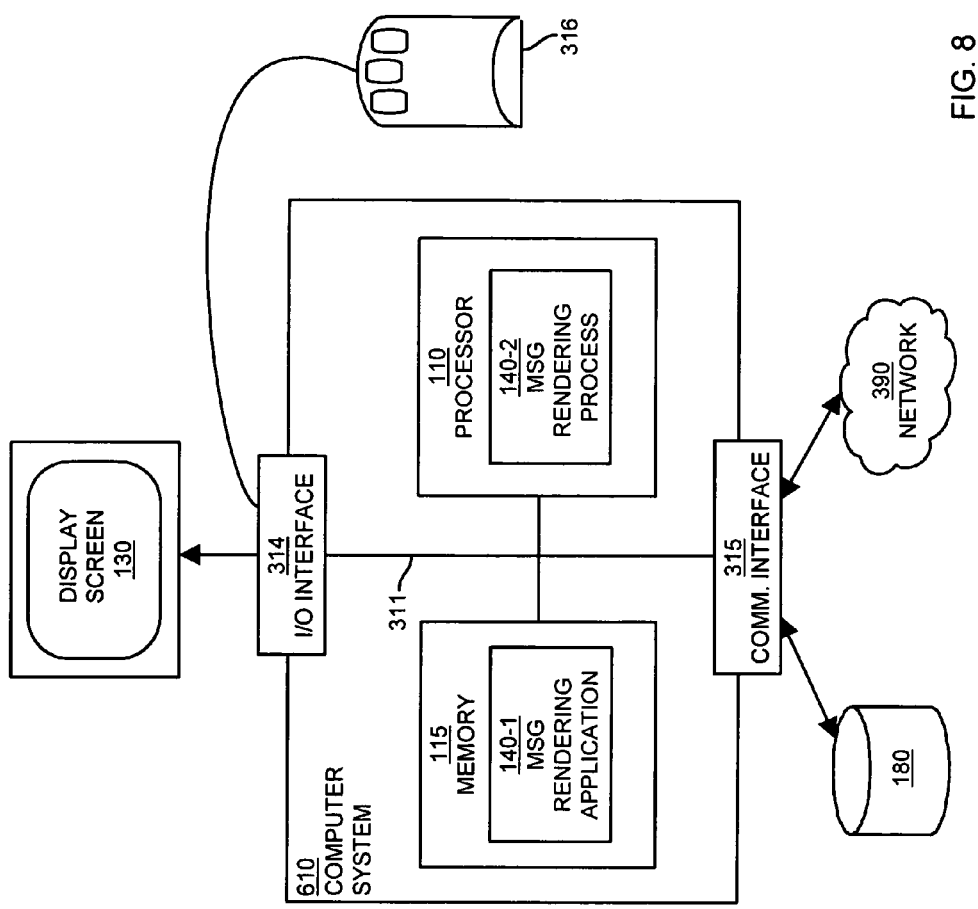
FIG. 8 is a diagram of an example platform for executing a message rendering process according to embodiments herein.

FIG. 8 is a block diagram illustrating an example computer system 610 (e.g., a management control center) for executing message rendering process 140-2 and other related processes according to embodiments herein. Computer system 610 can be a computerized device such as a personal computer, workstation, portable computing device, console, network terminal, processing device, etc.

As shown, computer system 610 of the present example includes an interconnect 311 that couples a memory system 115, a processor 110, an I/O interface 314, and a communications interface 315. Peripheral devices 316 (e.g., one or more optional user controlled devices such as a keyboard, mouse, display screens, etc.) couple to processor 110 through I/O interface 314. I/O interface 314 also enables computer system 610 to access repository 180 and display configuration information on display screen 130. Communications interface 315 enables computer system 310 to communicate over network 390 to transmit and receive information from different resources. In one embodiment, computer system 610 can initiate the display of configuration information on corresponding display screens for viewing by one or more respective network administrators (e.g., user 108) that manage and view configuration associated with storage area network environment 100 (FIG. 1).

As shown, memory system 115 is encoded with message rendering application 140-1 supporting generation of messages depending on a selected display context 111. Message rendering application 140-1 can be embodied as software code such as data and/or logic instructions (e.g., code stored in the memory or on another computer readable medium such as a disk) that support functionality according to different embodiments described herein.

During operation, processor 110 accesses memory system 115 via the interconnect 311 in order to launch, run, execute, interpret or otherwise perform the logic instructions of the message rendering application 140-1. Execution of message rendering application 140-1 produces processing functionality in message rendering process 140-2. In other words, the map manager process 140-2 represents one or more portions of the map manager application 140-1 (or the entire application) performing within or upon the processor 110 in the computer system 610.

It should be noted that message rendering process 140-2 (also in FIG. 1) executed in an environment such as computer system 610 can be represented by either one or both of the message rendering application 140-1 and/or the message rendering process 140-2. For purposes of this discussion and different embodiments herein, general reference will again be made to the map manager 140-2 as performing or supporting the various steps and functional operations as previously discussed and as will be discussed further in this specification.

It should be noted that, in addition to the message rendering process 140-2, embodiments herein include the message rendering application 140-1 itself (i.e., the un-executed or non-performing logic instructions and/or data). The message rendering application 140-1 can be stored on a computer readable medium such as a floppy disk, hard disk, or optical medium. The message rendering application 140-1 can also be stored in a memory type system such as in firmware, read only memory (ROM), or, as in this example, as executable code within the memory system 115 (e.g., within Random Access Memory or RAM). In addition to these embodiments, it should also be noted that other embodiments herein include the execution of message rendering application 140-1 in processor 110 as the message rendering process 140-2. Thus, those skilled in the art will understand that the computer system 610 may include other processes and/or software and hardware components, such as an operating system that controls allocation and use of hardware resources.

Functionality supported by computer system 610 such as a management control center utilizing message rendering process 140-2 will now be discussed with respect to flowcharts in FIGS. 9-11. For purposes of this discussion, computer system 610 and, more particularly, message rendering process 140-2 perform steps in the flowcharts at run-time. This functionality can be extended to the other entities as well. Also, note that the steps in the below flowcharts need not always be executed in the order shown.

Figure 9:
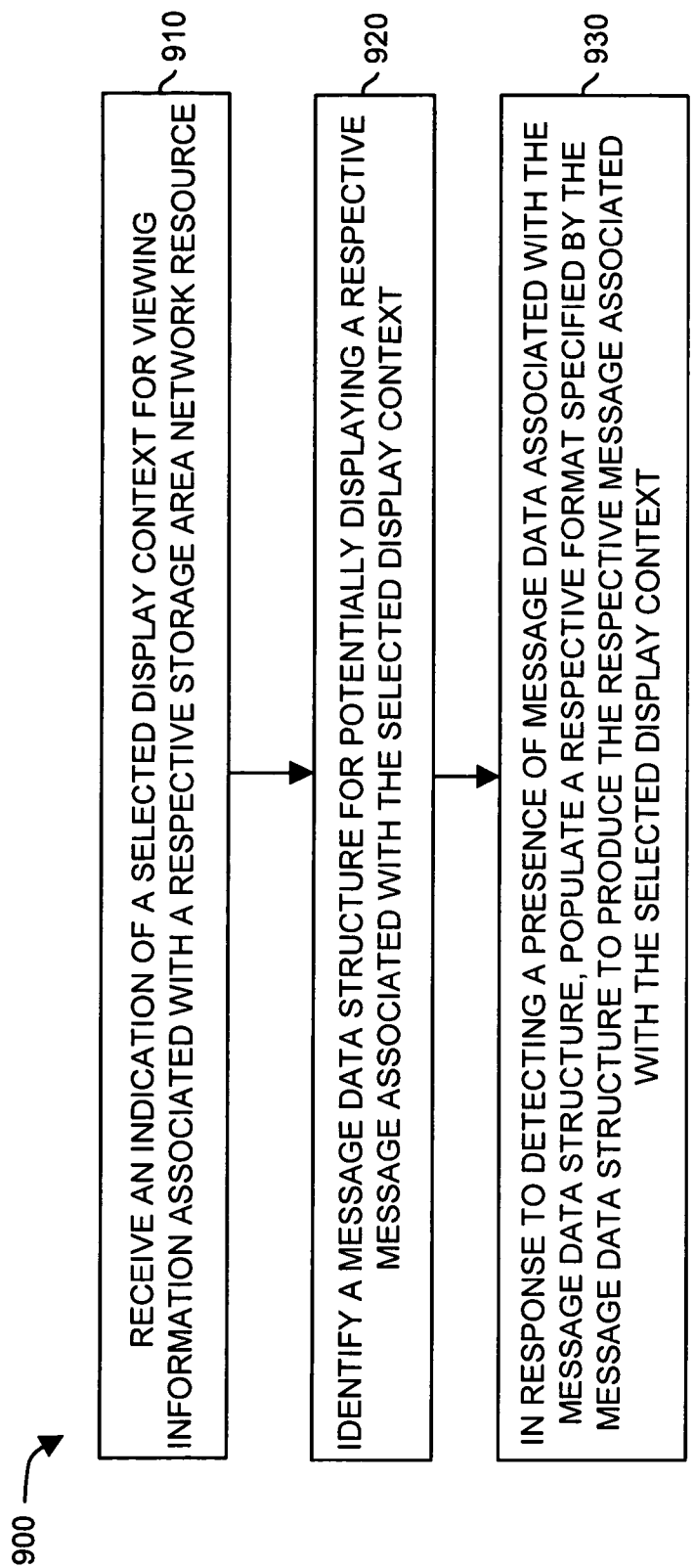
FIG. 9 is a flowchart illustrating techniques of rendering messages according to embodiments herein.

Now, more particularly, FIG. 9 is a flowchart 900 illustrating a technique of rendering rule violation messages associated with a respective storage area network environment 100 according to an embodiment herein. Note that techniques discussed in flowchart 900 overlap and summarize the techniques discussed above.

In step 910, the message rendering process 140-2 receives an indication of a selected display context 11 for viewing information associated with a respective storage area network resource (e.g., SERVER 1).

In step 920, the message rendering process 140-2 identifies a message data structure (e.g., message data structure 161-1) for potentially displaying a respective message 135 associated with the selected display context 111.

In step 930, in response to detecting a presence of message data 150 (e.g., record 151-1 and record 151-3) associated with the message data structure 161-1, the message rendering process 140-2 populates a respective format (e.g., format A or format B) specified by the message data structure 161-1 to produce the respective message 135 (or messages) associated with the selected display context 111.

Figure 10:
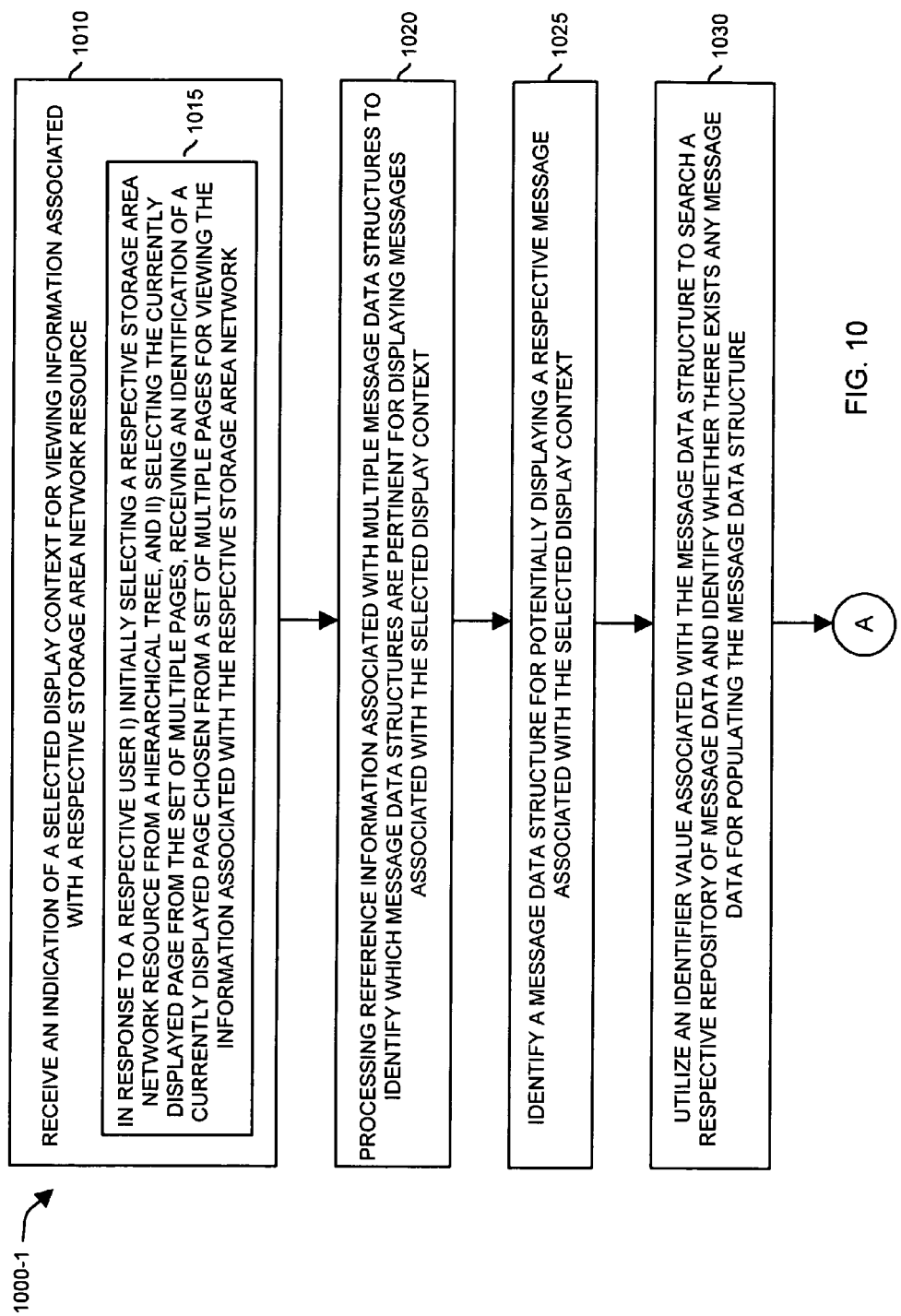
FIGS. 10 and 11 combine to form a more detailed flowchart illustrating techniques rendering messages according to embodiments herein.
Figure 11:
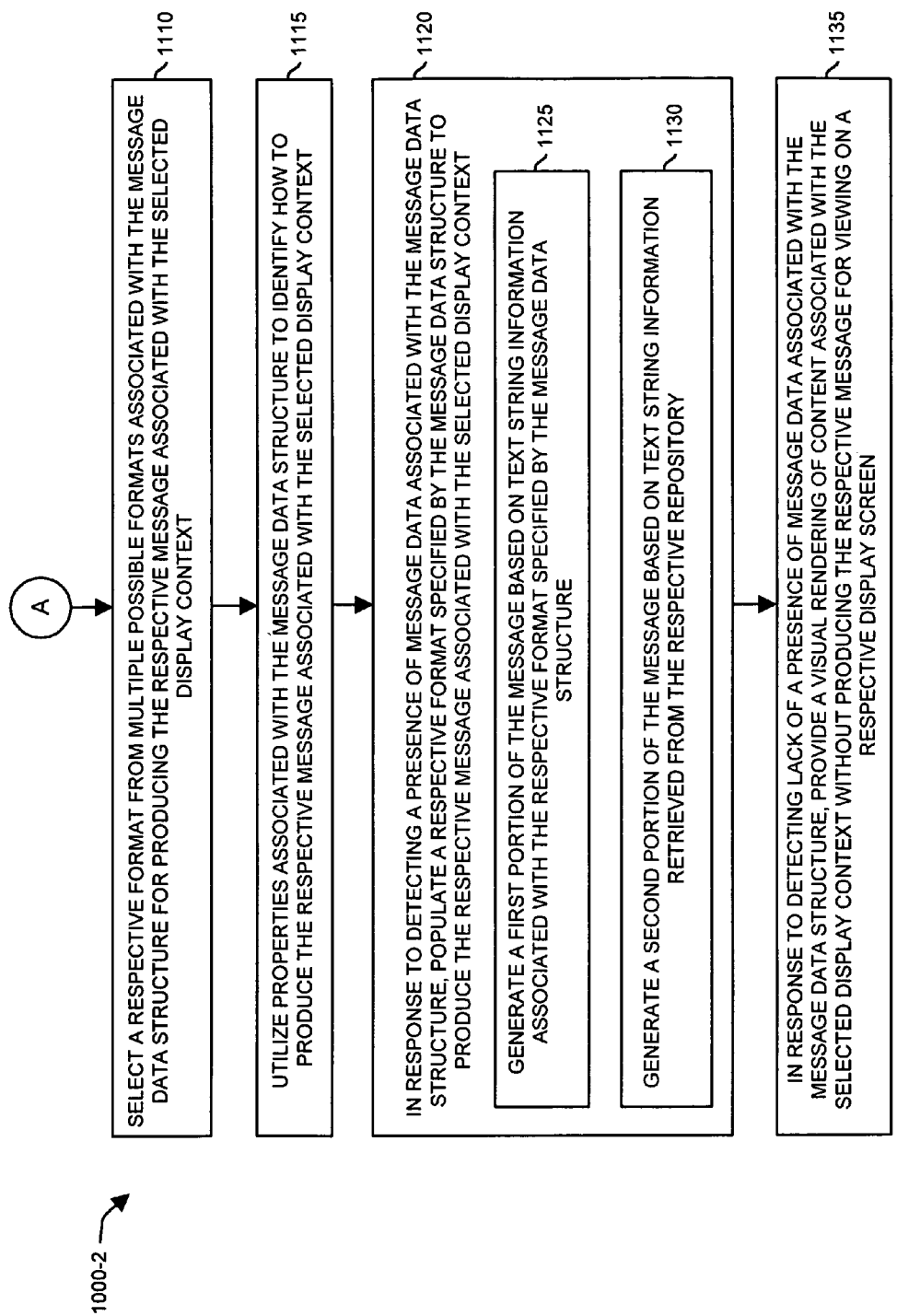

FIGS. 10 and 11 combine to form a flowchart 1000 (e.g., flowchart 1000-1 and flowchart 1000-2) illustrating processing steps associated with message rendering process 140-2 according to an embodiment herein. Note that techniques discussed in flowchart 1000 overlap with the techniques discussed above in the previous figures.

In step 1010, the message rendering process 140-2 receives an indication of a selected display context 111 for viewing information associated with a respective storage area network resource.

In sub-step 1015 associated with step 1010, in response to a respective user i) initially selecting a respective storage area network resource (e.g., SEVER 1) from a hierarchical tree 120, and ii) selecting the currently displayed page (e.g., a server page) from a set of multiple pages, the message rendering process 140-2 receives an identification of the currently displayed page chosen from a set of multiple pages for viewing the information associated with the respective storage area network.

In step 1020, the message rendering process 140-2 processes reference information associated with multiple message data structures 160 to identify which message data structures 160 are pertinent for displaying messages 135 associated with the selected display context 111.

In step 1025, the message rendering process 140-2 identifies a message data structure (e.g., message data structure 161-1) for potentially displaying a respective message associated with the selected display context 111.

In step 1030, the message rendering process 140-2 utilizes an identifier value (e.g., a rule value 1001) associated with the message data structure 161-1 to search a respective repository 180 of message data 150 and identify whether there exists any message data (e.g., records 151-1 and 151-3) for populating a respective format in the message data structure 161-1.

In step 1110 of FIG. 11, the message rendering process 140-2 selects a respective format in data structure 161-1 from multiple possible formats associated with the message data structure 161-1 for producing the respective message 135 associated with the selected display context 111.

In step 1115, the message rendering process 140-2 utilizes properties (e.g., supplemental display property information 420 associated with the message data structure 161-1 to identify how to produce the respective message 135 associated with the selected display context 111.

In step 1120, in response to detecting a presence of message data 150 (e.g., records 151-1 and 151-3 associated with the message data structure 161-1, the message rendering process 140-2 populates a respective format specified by the message data structure 161-1 to produce the respective message 135 associated with the selected display context 111.

In sub-step 1125 associated with step 1120, the message rendering process 140-2 generates a first portion of a message 135 based on text string information associated with the respective format specified by the message data structure 161-1.

In sub-step 1130 associated with step 1120, the message rendering process 140-2 generates a second portion of the message based on text string information retrieved from record 151-1 and 151-3 stored in respective repository 180.

In step 1135, in response to detecting lack of a presence of message data 150 associated with the message data structure 161-1 (because there happen to be no failures associated with another rule such as rule 1009), a display application associated with display screen 130 provides a visual rendering of content associated with the selected display context 111 without producing the respective message 135 for viewing on a respective display screen 130.

Figure 12:
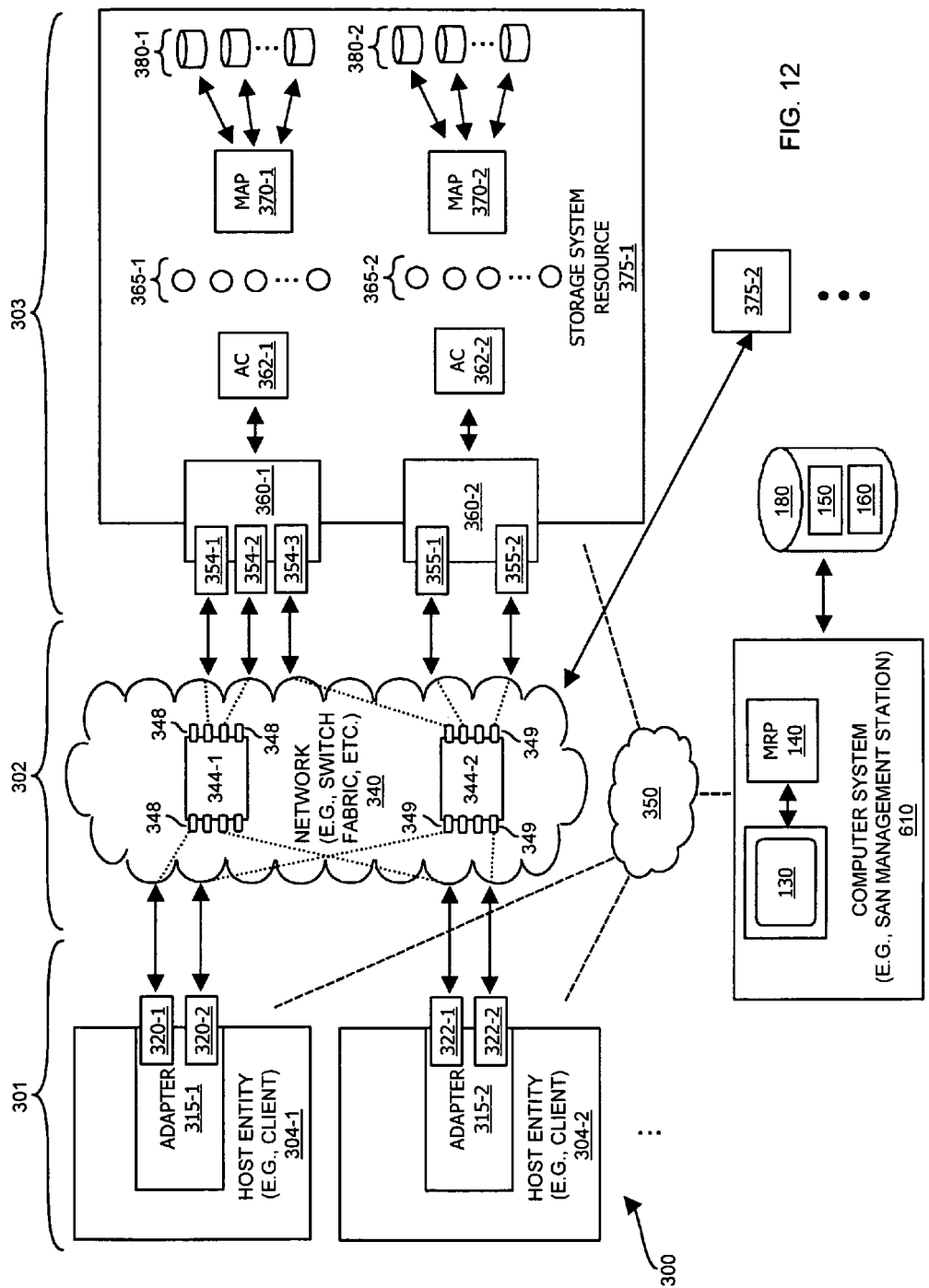
FIG. 12 is a block diagram illustrating resources in a storage area network environment represented by managed objects according to an embodiment herein.

FIG. 12 is a block diagram more particularly illustrating connectivity of example network resources (e.g., host resources 301, switch resources 302, and storage resources 303) in a storage area network environment 300. The network resources and SAN configuration information 104 can be represented by managed objects and corresponding relationship information stored in repository 180 or other storage resource. In general, FIG. 12 illustrates different types of resources that can be employed in a respective storage area network environment 300.

As previously discussed for FIG. 1, a SAN advisory process 106 can apply rules 118 to produce message data 150 stored in repository 180. Message rendering process 140-2 detects a display context associated with matter on display screen 130 conditionally creates and displays pertinent rule violation messages for viewing on display screen 130.

Now referring to FIG. 12, storage area network environment 300 includes host entity 304-1 (e.g., a server), host entity 304-2, . . . (collectively, host entities 304), network 340 (e.g., a high speed fiber-based switch fabric), network 350 (e.g., LAN, WAN, Internet, intranet, etc.), storage system resource 375-1, storage system resource 375-2, computer system 110, and repository. Network 340 includes switch device 344-1, switch device 344-2, and corresponding switch ports 348 and 349. Host entity 304-1 includes adapter 315-1. Adapter 315-1 (e.g., host bus adapter) has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

In general, network 340 and related resources enable host entities 304 (e.g., clients, host computers, etc.) to access data in storage system resources 375. As an example, host entity 304-1 couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375. Thus, switch devices 344 and corresponding ports 348 and 349 form at least part of a connection path between host entities 304 and corresponding storage system resources 375.

Storage system resource 375-1 (e.g., a storage system) includes access controllers 362 to facilitate access to corresponding storage devices 365 (e.g., logical storage space or devices). Storage devices 365 are configured as logical portions of one or more physical storage devices 380 (e.g., arrays of one or more storage disks or portions thereof). Maps 370 provide a mapping of storage devices 365 (e.g., logical volumes) to corresponding physical storage devices 380 (e.g., storage disks).

Each host entity 304 may be limited to accessing certain storage devices 365 in storage system resource 375-1 based at least in part on configuration settings of switch devices 344 of network 340.

Computer system 610 enables a storage area network administrator to communicate over network 350 and remotely modify a configuration of the storage area network 300. For example, in one embodiment, a storage area network administrator at a respective process (110 or 410) can modify the configuration of storage area network 300 by sending a respective command to management control center 115 to initiate a particular command (e.g., delete) with respect to a managed object representing a respective storage system in the storage area network. In addition to being able to remotely modify the configuration of storage area network 330, note also that a network administrator can physically change storage area network resources by replacement of one storage area network resource with another. Accordingly, a respective network administrator can potentially address rule violation messages in a number of different ways.

Figure 13:
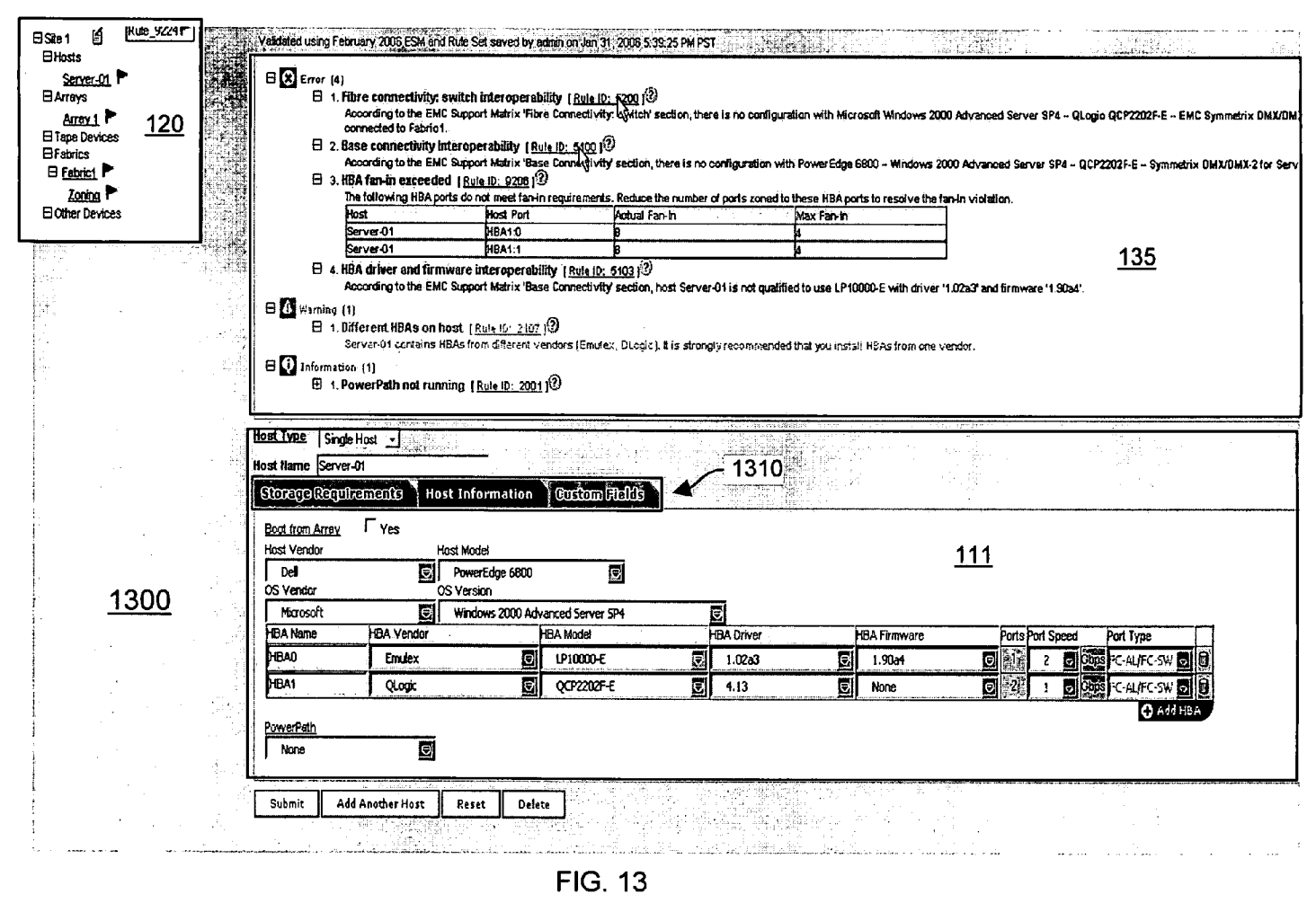

FIG. 13 is a sample screenshot 1300 of display screen 130 including resource incompatibility messages 135 according to an embodiment herein. As shown, a respective user 108 selects Server-01 from hierarchical tree 120. In response to the selection, a corresponding display application associated with display screen 130 generates the display context 111 including selectable tabs 1310 and information data fields for viewing different types of information associated with the selected storage area network resource Server-01. In accordance with the embodiments discussed above, the message rendering process 140-2 displays messages 135 to notify a user of errors (e.g., as a result of incompatible storage area network resources), warnings (e.g., a suggestion to utilize HBAs from the same vendor), and relevant information (e.g., a message indicating that a power path is not running).

Figure 14:
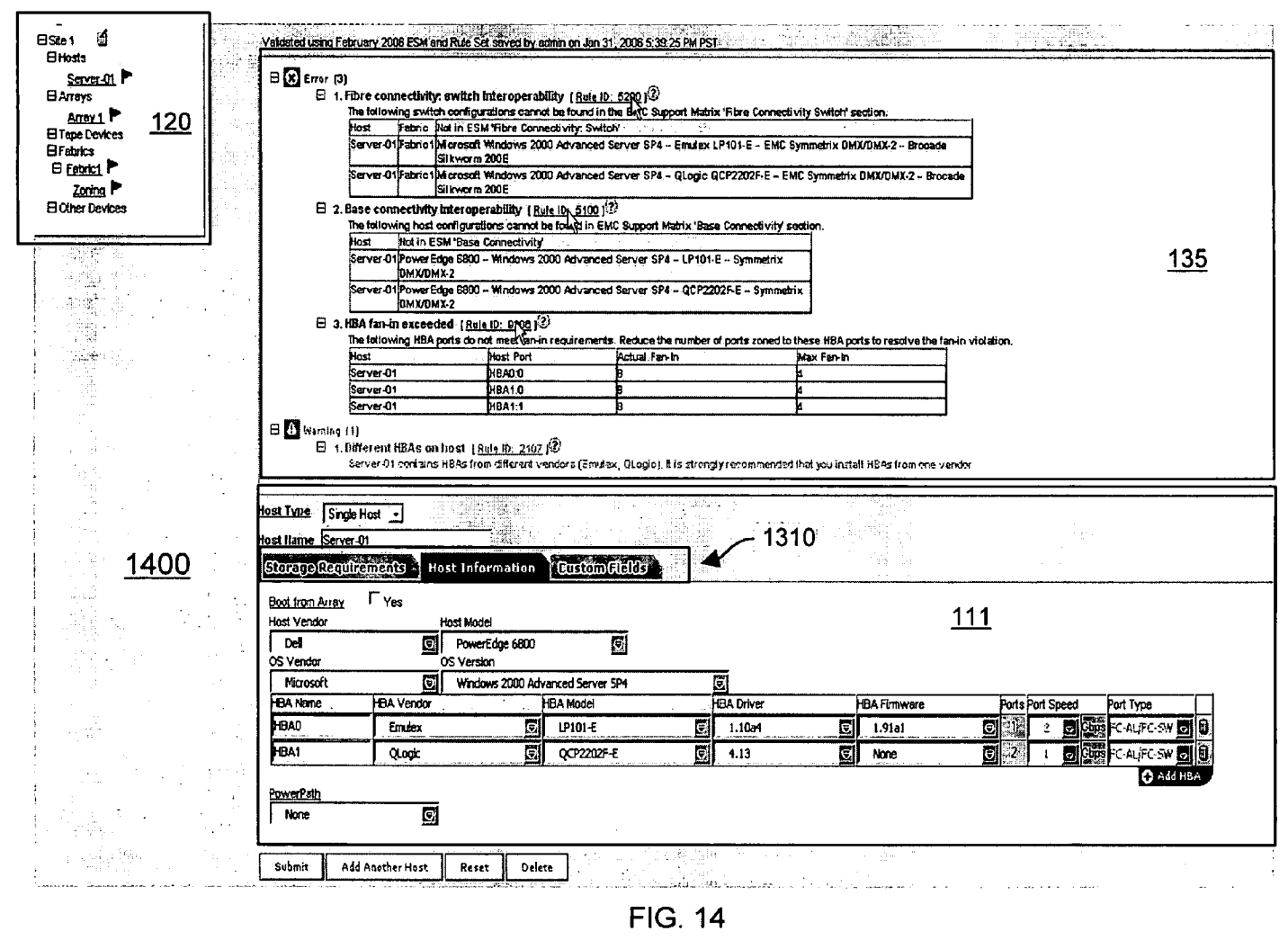

FIG. 14 is a sample screenshot 1400 of a display screen 130 including resource incompatibility messages 135 according to an embodiment herein. As shown, a respective user 108 selects Server-01 from hierarchical tree 120. In response to the selection, a corresponding display application associated with display screen 130 generates the display context 111 including selectable tabs 1410 and information data fields for viewing different types of information associated with the selected storage area network resource Server-01. In accordance with the embodiments discussed above, the message rendering process 140-2 displays messages 135 to notify a user of errors, warnings, and relevant information.

Figure 15:
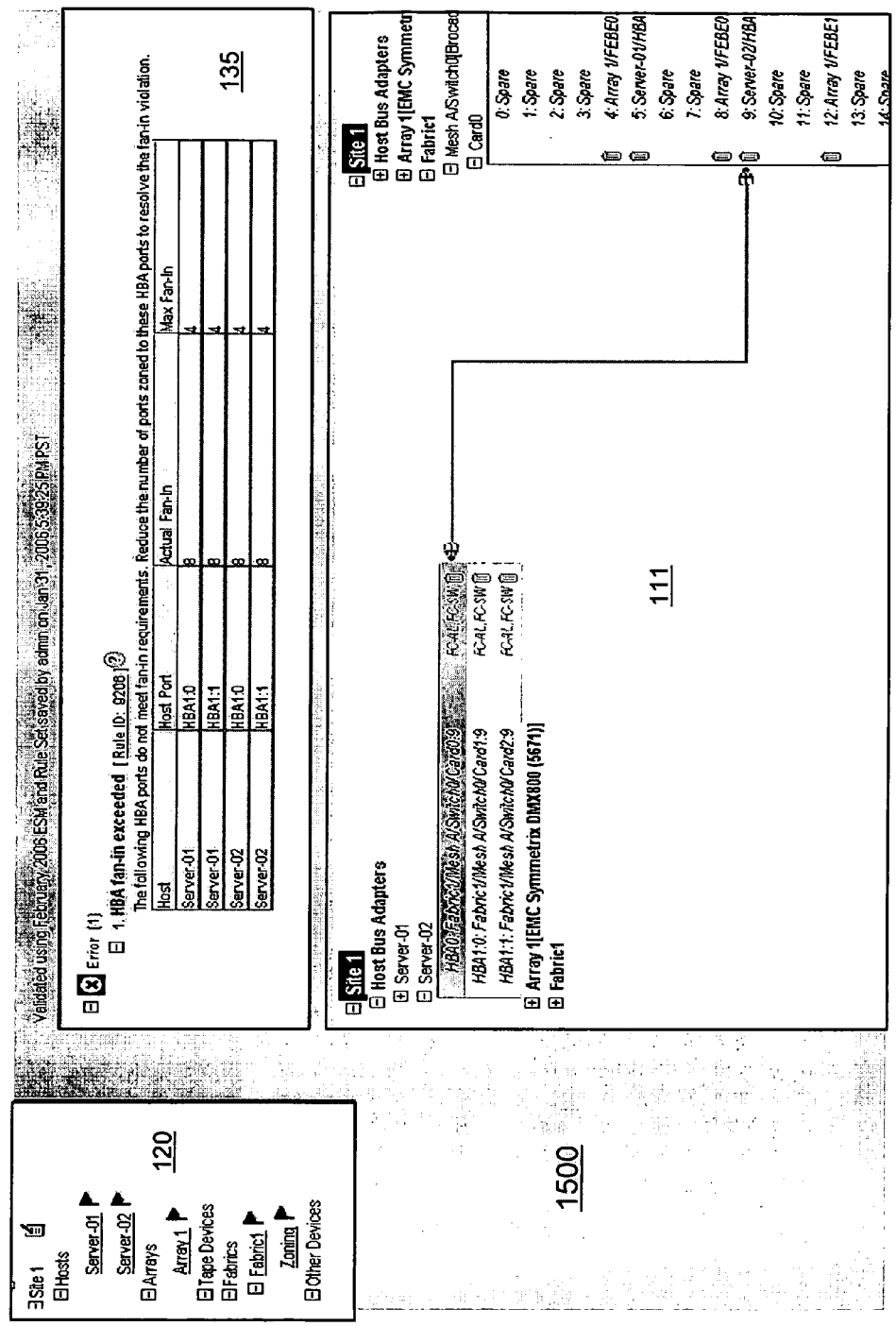
FIG. 15 is a sample screenshot of a display screen including resource incompatibility messages according to an embodiment herein.

FIG. 15 is a sample screenshot 1500 of a display screen 130 including resource incompatibility messages 135 according to an embodiment herein. As shown, a respective user 108 selects Server-01 and Server-02 from hierarchical tree 120. In response to the selection, a corresponding display application associated with display screen 130 generates the display context 111 including selectable tabs 1410 and information data fields for viewing different types of information associated with the selected storage area network resources Server-01 and Server-02. In accordance with the embodiments discussed above, the message rendering process 140-2 displays messages 135 to notify a user of errors, warnings, and relevant information associated with Server-01 and Server-02.

The following is an example illustrating a more complex set of Message Properties according to an embodiment herein:

/**
 * HBA fan-in exceeded
 * @indigo.rule
 * id="9206"
 * description="Identifies HBA ports that violate the fan-in limit."
 * category="Logical Fabric"
 * objects="Host"
 * type="Error"
 *                      single.message="Host <b>${SiteSlash}${ServerName}</b> port ${ShortPortName} has a fan-in of 11{ActualFanIn}, which exceeds the fan-in limit of 1:${MaxFanIn} for the HBA. Reduce the number of ports zoned to this HBA port to resolve the fan-in violation."
 * combined.message="The following HBA ports do not meet fan-in requirements. Reduce the number of ports zoned to these HBA ports to resolve the fan-in violation."
 * table.col0.key="Site"
 * table.col1.key="Host"
 * table.col2.key="Host Port"
 * table.col3.key="Actual Fan-In"
 * table.col4.key="Max Fan-In"
 * table.col0.data="${Site}"
 * table.col1.data="$ {ServerName}"
 * table.col2.data="${ShortPortName}"
 * table.col3.data="${ActualFanIn}"
 * table.col4.data="${MaxFanIn}"
 * condition.0="A fabric has an active zone set or has default zone enabled (rule 9210 did not fire)."
 * condition.1="An HBA port is logically connected (zoned) to multiple array ports through one or more active zones
 * and/or default zone of a fabric."
 * condition.2="All these ports are physically connected to the fabric."
 * condition.3="The number of array ports exceeds the fan-in limit of the HBA port. The fan-in value for HBA
 * port comes ESM. A default value of 4 is used when fan-in value can not be obtained from ESM."
 * showin="config.*.${CompId},config.topology.access, config.overview"
 * showinpages="Array page,Zoning page of fabric, Topology Access Page, Overview results page"
 * notes.0="If a zone has a switch port as a member, the port connected to that switch port will be treated as zone's zone member."
 * notes.1="Default zone will be considered."
 * url="9206.htm"
 * enabled="yes"
 * editable="yes"
 */
public final static Integer R9206=new Integer(9206);

As discussed above, techniques herein are well suited for use in applications such as management and display of incompatibility messages associated with a respective storage area network environments and any type of messaging applications. However, it should be noted that configurations herein are not limited to such use and thus configurations herein and deviations thereof are well suited for use in other environments that generate messages as well.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

We claim:

1. A method comprising:

receiving an indication of a selected type of display page for viewing information associated with a respective storage area network resource;

identifying, based on the selected type of display page, a message data structure for displaying a respective message associated with the selected type of display page;

utilizing an identifier value associated with the message data structure to identify if message data is available for populating the message data structure;

in response to detecting a presence of the message data based on the identifier value, populating a respective message format as specified by the message data structure to produce the respective message associated with the selected type of display page;

wherein identifying the message data structure comprises searching multiple message data structures for a reference value, presence of the reference value in the message data structure indicating that the message data structure is pertinent for displaying messages associated with the selected type of display page;

wherein utilizing the identifier value comprises obtaining the identifier value from the message data structure, the identifier value indicating a particular resource incompatibility rule that generated the message data; and wherein detecting the presence of the message data comprises detecting that the message data includes the identifier value.

2. A method as in claim 1, wherein receiving the indication of the selected type of display page includes receiving an identification of a particular page type chosen from a set of multiple types of display pages, the particular page type chosen for viewing configuration information associated with the respective storage area network;

wherein receiving the indication of the selected type of display page occurs in response to a respective user: i) initially selecting the respective storage area network resource from a hierarchical tree, and ii) selecting e-mail as an option for receiving a storage area network advisory report, the method further comprising:

sending, via e-mail, the respective message in the storage area network advisory report for viewing by a user.

3. A method as in claim 1 further comprising:

for each corresponding message data structure of multiple message data structures:

storing reference information indicating a respective set of at least one selectable display pages to which the corresponding message data structure pertains;

storing formatting information specifying a corresponding format for displaying message information associated with the at least one selectable display pages.

4. A method as in claim 1, wherein populating the respective message format as specified by the message data structure includes:

generating a first portion of the respective message to include text string information retrieved from the respective message format as specified by the message data structure;

generating a second portion of the respective message to include text string information retrieved from the message data; and initiating display of the respective message to include the text string information retrieved from the respective message format and the text string information retrieved from the message data.

5. A method as in claim 1, wherein receiving the indication of the selected type of display page for viewing information associated with the respective storage area network resource includes receiving an indication of a resource identifier specifying the respective storage area network resource;

utilizing the resource identifier to identify which portion of compatibility violation data records pertain to the respective storage area network resource; and wherein populating the respective message format includes utilizing the identified portion of the compatibility violation data to produce the respective message, the respective message including the compatibility violation data to indicate that the respective storage area network resource is incompatible for use with another storage area network resource.

6. A method as in claim 1 further comprising:

prior to populating the respective message format specified by the message data structure:

selecting the respective message format from multiple possible formats associated with the message data structure for producing the respective message associated with the selected type of display page; and utilizing properties associated with the message data structure to identify how to produce the respective message associated with the selected type of display page.

7. A method as in claim 6 further comprising:

based on processing of the message data, determining, from the message data, a number of compatibility violations associated with the respective storage area network resource for displaying in the respective message; and wherein selecting the particular format includes selecting a format to accommodate the number of violations associated with the message data.

8. A method as in claim 1, wherein receiving the indication of the selected type of display page includes receiving historical information identifying a navigation path of multiple successive pages selected by a user viewing a display screen, the method further comprising:

populating the respective message format for display on the display screen depending on the navigation path.

9. A computer program product including a computer-readable storage medium having instructions stored thereon for processing data information, such that the instructions, when carried out by a processing device, enable the processing device to perform the steps of:

receiving an indication of a selected type of display page for viewing information associated with a respective storage area network resource;

identifying, based on the selected type of display page, a message data structure for displaying a respective message associated with the selected type of display page;

utilizing an identifier value associated with the message data structure to identify if message data is available for populating the message data structure;

in response to detecting a presence of the message data based on the identifier value, populating a respective message format as specified by the message data structure to produce the respective message associated with the selected type of display page;

wherein identifying the message data structure comprises searching multiple message data structures for a reference value, presence of the reference value in the message data structure indicating that the message data structure is pertinent for displaying messages associated with the selected type of display page;

wherein utilizing the identifier value comprises obtaining the identifier value from the message data structure, the identifier value indicating a particular resource incompatibility rule that generated the message data; and wherein detecting the presence of the message data comprises detecting that the message data includes the identifier value.

10. A computer program product as in claim 9 including instructions that further support steps of:

determining a number of violations associated with a particular storage area network resource incompatibility rule as indicated by contents of the message data; and based on the number of violations, selecting one of multiple message formats associated with the message data structure to display at least one storage area network configuration violation associated with the incompatibility rule.

11. A computer system comprising:

a processor;

a memory unit that stores instructions associated with an application executed by the processor; and an interconnect coupling the processor and the memory unit, enabling the computer system to execute the application and perform operations of:

receiving an indication of a selected type of display page for viewing information associated with a respective storage area network resource;

identifying, based on the selected type of display page, a message data structure for displaying a respective message associated with the selected type of display page;

utilizing an identifier value associated with the message data structure to identify if message data is available for populating the message data structure;

in response to detecting a presence of the message data based on the identifier value, populating a respective message format as specified by the message data structure to produce the respective message associated with the selected type of display page;

wherein identifying the message data structure comprises searching multiple message data structures for a reference value, presence of the reference value in the message data structure indicating that the message data structure is pertinent for displaying messages associated with the selected type of display page;

wherein utilizing the identifier value comprises obtaining the identifier value from the message data structure, the identifier value indicating a particular resource incompatibility rule that generated the message data; and wherein detecting the presence of the message data comprises detecting that the message data includes the identifier value.

12. The method as in claim 1, wherein the respective storage area network resource is a first storage area network resource, the method further comprising:

prior to receiving the indication of the selected type of display page:

applying compatibility rules to a network configuration including the first storage area network resource and a second storage area network resource to determine whether the respective storage area network resource is compatible for use with the second storage area network resource in the network configuration; and in response to detecting a failure with respect to a given rule of the compatibility rules, generating the message data to include the identifier value, the identifier value specifying the given rule, inclusion of the identifier value in the message data indicating that the respective storage area network resource is not compatible for use with the second storage area network in the network configuration.

13. The method as in claim 12, wherein populating the respective message format includes:

retrieving a string of text from the message data structure;

retrieving a string of text from the message data;

combining the string of text from the message data structure to the string of text from the message data to create the respective message; and initiating display of the respective message with configuration information associated with the storage area network resource to indicate that the first storage area network resource is not compatible for use with the second storage area network resource.

* * * * *